United States Patent
Hajiyev et al.

(10) Patent No.: US 11,812,105 B2
(45) Date of Patent: Nov. 7, 2023

(54) SYSTEM AND METHOD FOR COLLECTING DATA TO ASSESS EFFECTIVENESS OF DISPLAYED CONTENT

(71) Applicant: Realeyes OÜ, Tallinn (EE)

(72) Inventors: Elnar Hajiyev, Tallinn (EE); Martin Salo, Tallinn (EE)

(73) Assignee: Realeyes OÜ, Tallinn (EE)

(*) Notice: Subject to any disclaimer, the term of this patent is extended or adjusted under 35 U.S.C. 154(b) by 0 days.

(21) Appl. No.: 17/633,687

(22) PCT Filed: Aug. 12, 2020

(86) PCT No.: PCT/EP2020/072590
§ 371 (c)(1),
(2) Date: Feb. 8, 2022

(87) PCT Pub. No.: WO2021/028463
PCT Pub. Date: Feb. 18, 2021

(65) Prior Publication Data
US 2022/0321955 A1     Oct. 6, 2022

(30) Foreign Application Priority Data
Aug. 13, 2019   (GB) ...................................... 1911564

(51) Int. Cl.
*H04N 21/442*   (2011.01)
*H04N 21/466*   (2011.01)
(Continued)

(52) U.S. Cl.
CPC ..... *H04N 21/44222* (2013.01); *H04N 21/437* (2013.01); *H04N 21/44218* (2013.01);
(Continued)

(58) Field of Classification Search
CPC .......... G06F 18/25; G06N 20/10; G06N 3/04; G06N 3/045; G06N 3/047; G06N 3/048;
(Continued)

(56) References Cited

U.S. PATENT DOCUMENTS

2005/0007965 A1* 1/2005 Hagen ................. H04L 12/1822
                                                                379/202.01
2012/0324494 A1 12/2012 Burger et al.
(Continued)

OTHER PUBLICATIONS

Phuong Pham et al., "Understanding Emotional Responses to Mobile Video Advertisements via Physiological Signal Sensing and Facial Expression Analysis", Intelligent User Interfaces (IUI) 2017—Multimodal and Augmented Interaction, Mar. 2017, pp. 67-78.
(Continued)

*Primary Examiner* — Rong Le
(74) *Attorney, Agent, or Firm* — Leason Ellis LLP

(57) ABSTRACT

A system and method for rapidly and scalably tracking attentiveness. The system includes means for collecting relevant data streams from a plurality of client devices while consumers view content, means for analysing the collected data with an AI-driven module that outputs one or more attentiveness metrics indicative of real attention, and means for synchronising the collected data with the attentiveness metrics. The system provides the ability to synchronise attentiveness metrics with other data streams to make accessible the reasons that drive attention. A digital advertising campaign can be optimised using an effectiveness data set that expresses evolution over time of an attentiveness parameter. An effect on the attentiveness parameter caused by an adjustment to a target audience can be predicted and evaluated against a campaign objective, which can be updated for predictions that yield a positive effect.

19 Claims, 9 Drawing Sheets

(51) Int. Cl.
*H04N 21/658* (2011.01)
*H04N 21/437* (2011.01)
*H04N 21/81* (2011.01)

(52) U.S. Cl.
CPC ..... *H04N 21/4667* (2013.01); *H04N 21/6582* (2013.01); *H04N 21/812* (2013.01)

(58) Field of Classification Search
CPC ........ G06N 3/084; G06V 10/80; G06V 10/82; G06V 40/174; G10L 21/0356; G10L 25/30; G10L 25/63; H04H 60/33; H04H 60/46; H04N 21/252; H04N 21/4143; H04N 21/42201; H04N 21/4223; H04N 21/437; H04N 21/4415; H04N 21/44204; H04N 21/44218; H04N 21/44222; H04N 21/44224; H04N 21/4667; H04N 21/6582; H04N 21/812; H04N 21/8173
See application file for complete search history.

(56) References Cited

U.S. PATENT DOCUMENTS

| | | |
|---|---|---|
| 2013/0218663 A1 | 8/2013 | el Kaliouby et al. |
| 2016/0063573 A1 | 3/2016 | Thakkar et al. |
| 2016/0198238 A1* | 7/2016 | Hajiyev ............. H04N 21/4532 725/12 |
| 2017/0139802 A1* | 5/2017 | Hajiyev .................. H04L 63/10 |
| 2017/0249663 A1* | 8/2017 | Hajiyev ............. G06Q 30/0269 |
| 2019/0012599 A1* | 1/2019 | el Kaliouby ........... G06N 3/084 |

OTHER PUBLICATIONS

Pramila Rani et al., "An empirical study of machine learning techniques for affect recognition in human-robot interaction", Pattern Analysis and Applications, vol. 9, No. 1, Apr. 2006, pp. 58-69.
Daniel McDuff et al., "Predicting Ad Liking and Purchase Intent: Large-Scale Analysis of Facial Responses to Ads", IEEE Transactions on Affective Computing vol. 6, No. 3, Jul. 2015, pp. 223-235.
Search Report in corresponding United Kingdom Application No. GB 1911564.1, dated Apr. 21, 2020, 4 pages.
International Search Report and Written Opinion in corresponding International Application No. PCT/EP2020/072590, dated Sep. 10, 2020, 17 pages.

* cited by examiner

SYSTEM AND METHOD FOR COLLECTING DATA TO ASSESS EFFECTIVENESS OF DISPLAYED CONTENT

CROSS-REFERENCE TO RELATED APPLICATIONS

This application is a U.S. National Stage Application under 35 U.S.C. § 371 of International Application No. PCT/EP2020/072590, filed Aug. 12, 2020, which claims priority to United Kingdom Patent Application No. 1911564.1, filed Aug. 13, 2019, the contents of which are each hereby incorporated by reference in their respective entireties.

FIELD OF THE INVENTION

The invention relates to techniques for collecting various data, e.g. from different sources or software, within a networked environment in real time, where that data is used to assess the performance of displayed content, which may also be available over the network. In particular, the invention relates to a technique for collecting data that permits measurement of user attention to displayed content at scale. Herein the displayed content may be any information that is can be consumed by a user using a network-enabled device. For example, the content can be any of: media content (e.g. video, music, images), advertising content, and webpage information.

BACKGROUND TO THE INVENTION

Certain types of media content, such as advertising, music videos, movies, etc., aim to induce changes in a consumer's emotional state, e.g. to catch a user's attention or otherwise increase their attentiveness. In the case of advertising, it may be desirable to translate this change in emotional state into performance, such as sales lift. For example, a television commercial may look to increase sales of a product to which it relates. There is a demand for a tool that can evaluate the performance of media content prior to publication.

Active feedback, which is also referred to as self-reported feedback, is sometimes used in attempts to determine or predict the performance of pieces of media content, such as video commercials. For active user feedback, users provide verbal or written feedback after consuming a piece of media content. For example, the users may complete a questionnaire, or may provide spoken feedback that can be recorded for analysis, e.g. manually or in an automated manner using speech recognition tools. Feedback may include an indication of emotional state experienced while consuming the piece of media content. However, active feedback from users pulls from rationalised, conscious thought processes, rather than the (passive) emotional state actually experienced. It has been shown that user preferences are outside of conscious awareness, and strongly influenced by passive emotional state. Media content performance therefore cannot be accurately predicted using active emotional state feedback.

It is known that emotional state data can also be measured in a passive manner, e.g. by collecting data indicative of a user's behavioural or physiological characteristics, e.g. while the user consumes a piece of media. In one example, facial responses can be used as passive indicators of experienced emotional state. Webcam video acquisition can be used to monitor facial responses, by capturing image frames as a piece of media content is consumed by a user. Emotional state can therefore be captured through the use of webcams, by processing video images.

Physiological parameters can also be good indicators of experienced emotional state. Many physiological parameters are not consciously controllable, i.e. a consumer has no influence over them. They can therefore be used to determine the true emotional state of a user consuming a piece of media content, which can in principle be used to accurately predict media content performance. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

It is increasingly common for users to posses wearable or portable devices capable of recording physiological parameters of the type described above. This opens up the possibility that such physiological measurements may be scalable to large sample sizes, which may enable statistical variations (noise) to be removed so that correlation with media content performance can be seen.

Emotional state information measured in this way has been shown to correlate with media content performance, and in particular sales lift. The proliferation of webcams on client devices means that capture of this type of data can be scaled to large sample sizes.

The behavioural characteristics of a user may manifest themselves in a variety of ways. References to "behavioural data" or "behavioural information" herein may refer to visual aspects of a user's response. For example, behavioural information may include facial response, head and body gestures or pose, and gaze tracking. In practice, it can be desirable to use a combination of raw data inputs comprising behavioural data, physiological data and self-reported data in order to obtain emotional state information. A combination of raw data from two or three of the sources mentioned above may be useful in identifying "false" indicators. For example, if emotional state data derived from all three sources overlaps or is aligned, it gives more confidence in the obtained signal. Any inconsistency in the signal may be indicative of a false reading.

False indications may arise where behavioural characteristics are recorded for a user who is reacting to something other than the media content currently on display. For example, the user may be distracted by another person while the media content is displayed. In that situation the behavioural characteristics of the user may be primarily influenced by their conversation with the other person, and therefore do not accurately reflect the user's response to the media content. The user's attentiveness to or engagement with the media content is therefore an important factor in determining the relevance of their collected behavioural characteristics.

The proliferation of web-enabled consumer device means that it is becoming increasingly difficult for marketers to capture consumers' attention. For consumers to be affected by advertising messages, it is essential for them to be paying attention. The ease with which consumers can be distracted means that it is increasingly desirable to accurately track viewer attentiveness. Current metrics, which may include number of impressions, number of views, number of click-throughs, etc., do not provide this information. In particular, they do not provide information to aid understanding about the causes of viewer distraction.

SUMMARY OF THE INVENTION

At its most general, the present invention proposes a system and method for rapidly and scalably tracking attentiveness. The system includes means for collecting relevant data streams from a plurality of client devices while consumers (users) view content, means for analysing the collected data with an AI-driven module that outputs one or more attentiveness metrics indicative of real attention, and means for synchronising the collected data with the attentiveness metrics.

The system can be configured to aggregate data to enable meaningful reports of the effectiveness of the content to be generated. In particular, the ability to synchronise the attentiveness metrics with other data streams can make accessible the reasons that drive attention. With this information, it becomes possible to generate recommendations that enable delivery of content to be targeted in places that optimise its effectiveness. Data may be aggregated for multiple consumers (e.g. a set of users having a common demographic or interest), or over multiple pieces of content (e.g. different video ads having a common theme, or from the same advertiser), or over a certain market campaign (e.g. data from a range of different ads that are linked to a common ad campaign), or over brand (e.g. data from all content that mentions or is otherwise linked to a brand).

The system and method of the invention may find use in facilitating the optimisation of an ad campaign. The collected data allowed effective real time monitoring of the attention share of a given ad campaign, or indeed for a brand that is displayed within a number of campaigns. The system and method of the invention may provide the ability to report on the reasons driving the attention, which in turn may assist in determining what steps to take to optimise an ad delivery strategy in order to achieve a campaign objective. Campaign objectives may be set against parameters that are measurable by the system. For example, an ad campaign may have an objective to maximise total attention time for given budget. In another example, a campaign objective may be to maximise a certain type of attention, e.g. from certain demographic group, or within a certain geographic region, or attention in the context of a certain positive emotion. In another example, a campaign objective may be to reach certain level of attention for the lowest cost. As discussed in more detail below, the system is not only able to use the data to report on performance against a campaign objective, but also able to make prediction about how certain additional actions would affect that performance. As such, the system provides a tool for optimising an ad campaign through the provision of recommended actions that are supported by a predicted effect on performance against a campaign objective.

Additionally or alternatively, the system and method of the invention can report on the emotion state associated with the attention. This may provide feedback on the whether the ad or brand is perceived positively or negatively.

According to the invention, there is provided a computer-implemented method of collecting data for determining attention paid to a display of content, the method comprising: displaying content on a client device; transmitting, from the client device over a network to an analysis server, contextual attribute data that is indicative of an interaction of a user with the client device during display of the content; collecting, at the client device, behavioural data of the user during display of the content; applying the behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content; synchronising, at the analysis server, the attention data with the contextual attribute data to generate an effectiveness data set that links evolution over time of the attentiveness parameter with corresponding contextual attribute data obtained during display of the content; and storing the effectiveness data set in a data store.

In one example, the content to be displayed may comprise media content. The method may thus further comprise: playing, using a media player application running on the client device, the media content; and the contextual attribute data is further indicative of an interaction of the user with the media player application during playing of the media content. The media player application may comprise an adaptor module configured to transmit, to the analysis server over the network, control analytics data for the media player application, and wherein the method comprises executing the adaptor module upon receiving the media content to be displayed.

The displayed content may be generated locally on the client device (e.g. by software running thereon). For example, the displayed content may be related to a game or app that runs locally. Additionally or alternatively, the displayed content may be obtained from the web, e.g. by download, streaming, etc. Thus, the step of displaying the content may comprise: accessing, by the client device over the network, a webpage on a web domain hosted by a content server; receiving, by the client device over the network, the content to be displayed by the webpage.

The method can thus operates to collect two or more of the following types of data from the client device: (i) contextual attribute data from a webpage, (ii) contextual attribute data from the media player application (if used), and (iii) behavioural data. Attention data is extracted from the collected data, and all the data is synchronised to enable the causes or drivers of attention to be researched.

In addition to the data collected from the client device, the analysis server may obtain additional information about the user from other sources. The additional information may include data indicative of demographics, user preferences, user interests, etc. The additional data may be incorporated into the effectiveness data set, e.g. as labels to permit the attention data to be filtered or sorted by demographics, user preferences or interests, etc.

The additional data may be obtained in various ways. For example, the analysis server may be in communication (directly or via the network) with an advertising system, such as a demand-side platform (DSP) for running programmatic advertising. The additional information may be obtain from a user profile held by the DSP, or can be obtained directly from the user, e.g. as feedback from a quiz, or through a social network interaction. The additional information may be obtained by analysing images captured by a webcam on the client device.

The media content may be a video, such as a video ad. The synchronisation of the attention data and contextual attribute data may be with respect to a timeline during which the video was played on the media player application. The behavioural data and the contextual attribute data may be time-stamped in a manner that enables a temporal relation between the various data to be established.

Display of the media content at the webpage may be triggered by accessing the webpage, or by taking some predetermined action on the webpage. The media content may be hosted on web domain, e.g. directly embedded in the content of the webpage. Alternatively, the media content may be obtained from separate entity. For example the content server may be a publisher who provides space in the webpage for advertisers. The media content may be an ad that is transmitted (e.g. as a result of an ad bidding process) from an ad server to fill the space in the webpage.

The media content may be thus may outside the control of the content server. Similarly, the media player application on which the media content is played may not be software that is resident on the client device. Accordingly, the contextual attribute data relating to the webpage may need to be obtained independently from the contextual attribute data relating to the media player application.

The classification algorithm may be located at the analysis server. Having a central location may facilitate the process of updating the algorithm. However, it is also possible for the classification algorithm to be at the client device, wherein instead of transmitting the behavioural data to the analysis server, the client device is arranged to transmit the attention and emotion data. An advantage of providing the classification algorithm on local devices is the increased privacy for the user, because their behavioural data does not need to be transmitted away from their computer. Running the classification algorithm locally also means that the processing capability required of the analysis server is much less, which can save cost.

Accessing the webpage may include obtaining a contextual data initiation script for execution on the client device. The contextual data initiation script may be machine readable code, e.g. located in a tag within the header of the webpage.

Alternatively, the contextual data initiation script may be provided within the communication framework through with the content is supplied to the client device. For example, where the content is a video ad, the communication framework typically involves an ad request from the client device, and a video ad response sent to the client device from an ad server. The contextual data initiation script may be included in the video ad response. The video ad response may be formatted in line with a Video Ad Serving Template (VAST) specification (e.g. VAST 3.0 or VAST 4.0), or may comply with any other ad response standard, e.g. Video Player Ad Interface Definition (VPAID), Mobile Rich Media Ad Interface Definition (MRAID), etc.

In a further alternative, the contextual data initiation script may be injected into webpage source code at an intermediary between the publisher (i.e. originator of webpage) and the user (i.e. client device). The intermediary may be a proxy server, or may be a code injection component within a network router associated with the client. In these examples, the publisher need not incorporate the contextual data initiation script in its version of the webpage. This means that the contextual data initiation script need not be transmitted in response to every webpage hit. Furthermore, this technique may enable the script to be included only in requests from client devices that are associated with users that have granted permission for their behavioural data to be collected. In some examples, such users may form a panel for assessing the effectiveness of web content before it is released to a wider audience.

The method may further include executing the contextual data initiation script at the client device to perform one or more preliminary operations, before the content is displayed. The preliminary operations include any of: determining consent to transmit the contextual attribute data and behavioural data to the analysis server; determining availability of a device for collecting the behavioural data; and ascertaining whether or not the user is selected for behavioural data collection. The method may comprise terminating a behavioural data collection procedure upon determining, by the client device using the contextual data initiation script that (i) consent to transmit behavioural data is withheld, or (ii) a device for collecting the behavioural data is not available, or (iii) the user is not selected for behavioural data collection. A determination of any one of these criteria may cause the behavioural data collection procedure to be terminated. In this case, the client device may only send the contextual attribute data to the analysis server. As discussed below, the contextual attribute data can be used to predict attention data.

Collecting the behavioural data may comprise capturing images of the user using a camera, e.g. a webcam or similar device. The captured images may be separate images or a video. The images preferably capture the user's face and upper body, i.e. so that changes in posture, head pose, etc. are observable. The contextual data initiation script may be configured to activate the camera.

The image or video data may be transmitted, e.g. streamed or other sent, from the client device using any suitable real-time communication protocol, e.g. WebRTC or the like. The method may include loading code for enabling the real-time communication protocol upon determining, by the client device using the contextual data initiation script, that (i) consent to transmit behavioural data is given, and (ii) a device for collecting the behavioural data is available, and (iii) the user is selected for behavioural data collection. To avoid slowing initial access to the webpage, the code for enabling the real-time communication protocol may not be loaded until all the conditions above are determined.

The contextual attribute data may comprise web analytics data for the webpage and control analytics data for the media player application. The analytics data may include any conventionally collected and communicated information for the webpage and media player application, such as viewability of any element, clickstream data, mouse movements (e.g. scrolls, cursor location), keystrokes, etc.

Execution of the contextual data initiation script may be arranged to trigger or initialise collection of web analytics data. Analytics data from the media player application may be obtained using an adaptor module, which can be a plug-in that forms part of the media player application software, or an separate loadable software adaptor that communicates with the media player application software. The adaptor module may be configured to transmit, to the analysis server over the network, control analytics data for the media player application, and wherein the method comprises executing the adaptor module upon receiving the media content to be displayed. The adaptor module may be activated or loaded plug through execution of the contextual data initiation script.

The contextual data initiation script may be executed as part of running the webpage, or running a mobile app for viewing content, or as part of running the media player application. The control analytics data and web analytics data may be transmitted to the analysis server from the entity within which the contextual data initiation script is running.

Where the behavioural data comprises a plurality of images showing the user's reaction over time, the classification algorithm may operate to evaluate the attentiveness parameter for each image in a plurality of images of the user captured during the display of the content.

In addition to the attention data, the behavioural data may be used to obtain emotional state information for the user. Thus, the method may further comprise: applying the behavioural data to an emotional state classification algorithm to generate emotional state data for the user, wherein the emotional state classification algorithm is a machine learning algorithm trained to map behavioural data to a emotional state data, and wherein the emotional state data is indicative of a variation over time in a probability that the user has a given emotional state during display of the content; and synchronising the emotional state data with the attention data, whereby the effectiveness data set further comprises the emotional state data.

The client device may be arranged to respond locally to detected emotional state and/or attentive parameter data. For example, the content may be obtained and displaying by an app running on the client device, where the app is configured to determine an action based on emotional state data and attentiveness parameter data generated at the client device.

The functionality described herein may be implemented as a software development kit (SDK) for use in creating apps or other programs that can utilise the attentive parameter or effectiveness data described above. The software development kit may be configured to provide the classification algorithm.

The method discussed herein is scalable for a networked computing environment comprising a plurality of client devices, a plurality of content servers and a plurality of different pieces or types of content. The method may thus include receiving, by the analysis server, contextual attribute data and behavioural data from a plurality of client devices. The analysis server may operate to aggregate a plurality of effectiveness data sets obtained from the contextual attribute data and behavioural data received from the plurality of client devices, e.g. according to the process set out above. The plurality of effective data sets may be aggregated with respect to one or more common dimensions shared by the contextual attribute data and behavioural data received from the plurality of client devices, e.g. for a given piece of media content, or for a group of related pieces of media content (e.g. relating to an ad campaign), or by web domain, by website identity, by time of day, by type of content or any other suitable parameter.

The result of carrying out the method discussed above is a data store that has thereon a rich effective data set that links user attention with other observable factors. The effective data sets may be stored in a data structure such as a database from which is can be queried to produce reports that enable relationships between the attention data and other data to be observed. The method may therefore further include: receiving, by a reporting device over the network, a query for information from the effectiveness data set; extracting, by the reporting device from the data store, response data in answer to the query; and transmitting, by the reporting device, the response data over the network. The query may be from a brand owner or a publisher.

The aggregated data may be used to update functionality on the client device. For example, where the content is obtained and displayed by an app running on the client device, the method may further comprise: determining a software update for the app using the aggregated effectiveness data sets; receiving the software update at the client device; and adjusting the app functionality by executing the software update.

As mentioned above, the method may enable attention data to be obtained even if behavioural data is not available. This can be done by using the contextual attribute data to predict attention data. The method may thus include, upon determining that no behavioural data is available from the client device: applying the contextual attribute data to a prediction algorithm to generate predicted attention data for the user, wherein the predicted attention data is indicative of variation of the attentiveness parameter over time during display of the content; and synchronising the predicted attention data with the contextual attribute data to generate a predicted effectiveness data set that links evolution over time of the attentiveness parameter with corresponding contextual attribute data obtained during display of the content.

The prediction algorithm may itself by a machine learning algorithm trained to map contextual attribute data to an attentiveness parameter. Alternatively or additionally, the prediction algorithm may be rule-based.

In another aspect, the invention may provide a system for collecting data for determining attention paid to web-based content, the system comprising a plurality of client device communicable over a network with a content server and an analysis server, wherein each client device is configured to: access a webpage on a web domain hosted by the content server; receive content to be displayed by the webpage; transmit, to the analysis server, contextual attribute data that is indicative of an interaction of a user of the client device with the webpage during display of the content; and collect behavioural data of the user during display of the content, wherein the system is further configured to: apply the received behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content, and wherein the analysis server is configured to: synchronise the attention data with the contextual attribute data to generate an effectiveness data set that links evolution over time of the attentiveness parameter with corresponding contextual attribute data obtained during display of the content; and store the effectiveness data set in a data store. Features of the method discussed above may be equally applicable to the system.

As mentioned above, the effectiveness data produced by the system can be used to make predictions about how certain additional actions will affect the performance of a given piece of content or a given ad campaign. In another aspect of the invention, there is provided a method for optimising an ad campaign in which recommended actions that are supported by a predicted effect on performance against a campaign objective are used to adjust a programmatic advertising strategy.

According to this aspect, there may be provided a computer-implemented method for optimising a digital advertising campaign, the method comprising: accessing an effectiveness data set that expresses evolution over time of an attentiveness parameter during playing of a piece of advertising content belonging to a digital advertising campaign to a plurality of users, wherein the attentiveness parameter is obtained by applying behavioural data collected from each user during playing of the piece of advertising content to a machine learning algorithm trained to map behavioural data to the attentiveness parameter; generating a candidate adjustment to a target audience strategy associated with the digital advertising campaign; predicting an effect on the attentiveness parameter applying the candidate adjustment; evaluating the predicted effect against a campaign objective for the digital advertising campaign; and updating the target audience strategy with the candidate adjustment if the predicted effect improves the attentiveness parameter by more than a threshold amount. The updating may be performed automatically, i.e. without human intervention. As such, the target audience strategy may be automatically optimised.

The effectiveness data set may be obtaining using the method discussed above, and therefore may have any of the features described herein. For example, the effectiveness data set may further include user profile information indicative of the users' demographics and interests. In such an example, the candidate adjustment to the target audience strategy may alter demographic or interest information of the target audience.

In practice, the method may generate and evaluate a plurality of candidate adjustments. The method may automatically implement all adjustments that lead to an improvement greater than the threshold amount. Alternatively or additionally, the method may including a step of presenting (e.g. displaying) all or a subset of the adjustments that lead to an improvement greater than threshold amount. The method may include a step of selecting, e.g. manually or automatically, one or more of the adjustments to be used to update the target audience strategy.

The step of automatically updating the target audience strategy may comprise communicating a revised target audience strategy to a demand-side platform (DSP). A method according to this aspect may thus be performed in a network environment, e.g. comprises the DSP, the analysis server discussed above, and a campaign management server. The DSP may operate in a conventional manner based on instructions from the campaign management server. The analysis server may have access to the effectiveness data set, and may be the entity that runs the campaign objective optimisation based on information from the campaign management server. Alternatively, the campaign objective optimisation may run on the campaign management server, which may be configured to send queries to the analysis server, e.g. to obtain and/or evaluate the predicted effect of a candidate adjustment to a target audience strategy.

BRIEF DESCRIPTION OF THE DRAWINGS

Embodiments of the invention are discussed in detail below with reference to the accompanying drawings, in which.

DETAILED DESCRIPTION; FURTHER OPTIONS AND PREFERENCES

Embodiments of the invention relate to a system and method of collecting and utilising behavioural data from a user while the user is consuming web-based content. In the examples below the displayed content is media content, e.g. video or audio. However, it is to be understood that the invention is applicable to any type of content that can be presented by a website.

Figure 1:
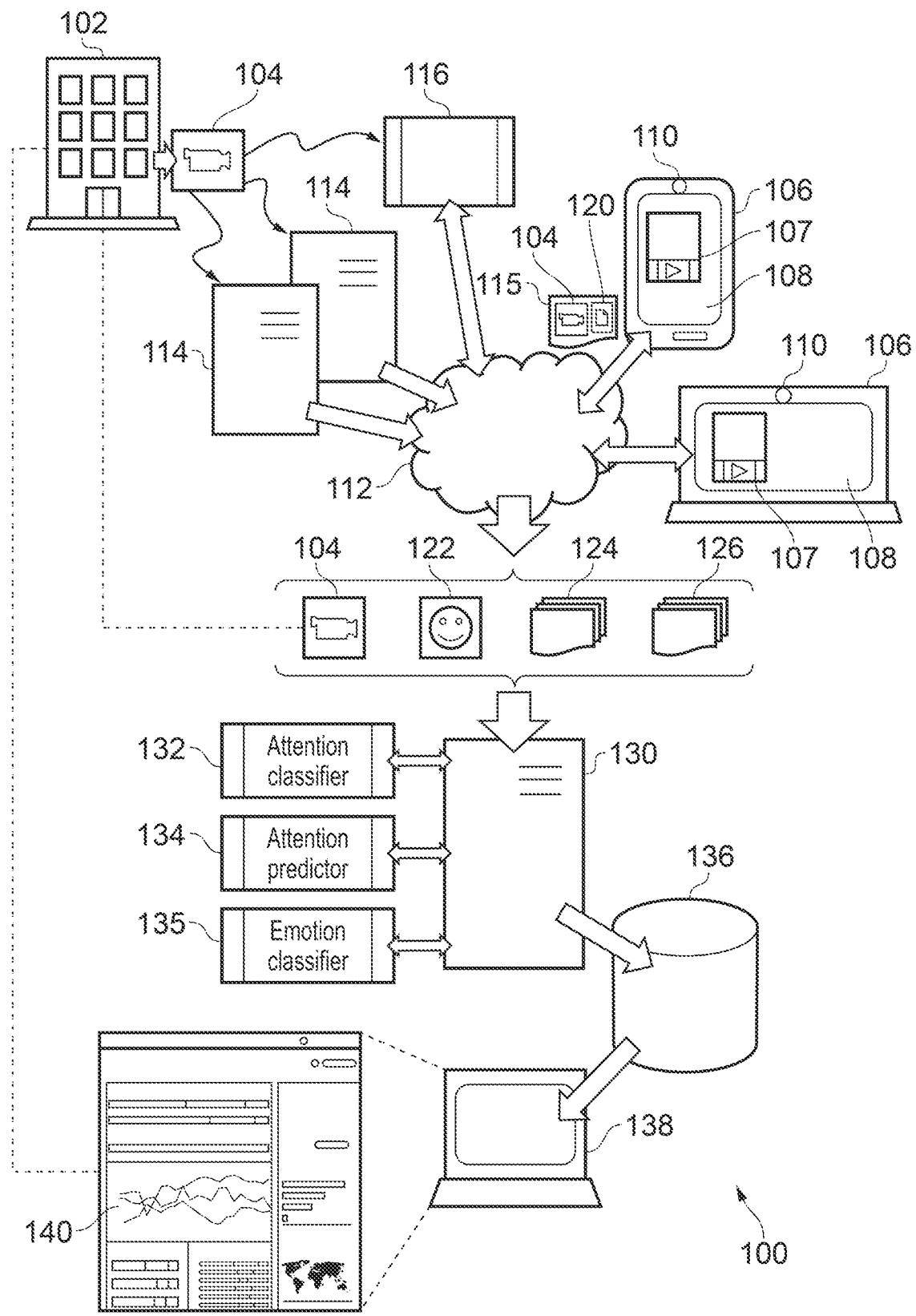
FIG. 1 is a schematic diagram of a data collection and analysis system that is an embodiment of the invention.

FIG. 1 is a schematic diagram of a data collection and analysis system 100 that is an embodiment of the invention. In the discussion below, the system is described in the context of evaluating media content 104 in the form of video ads that may be created, for example, by an brand owner 102. However, it can be understood that the system and method of the invention are applicable to any type of media content for which it is desirable to monitor consumer attention. For example, the media content may be training or safety videos, on-line learning materials, movies, music videos, or the like.

The system 100 is provided in a networked computing environment, where a number of processing entities are communicably connected over one or more networks. In this example, the system 100 comprises one or more client devices 106 that arranged to playback media content, e.g. via speakers or headphones and a software-based video player 107 on a display 108. The clients devices 106 may also comprise or be connected to behavioural data capture apparatus, such as webcams 110, microphones, etc. Example client devices 106 include smartphones, tablet computers, laptop computers, desktop computers, etc.

The client devices 106 are communicably connected over a network 112, such that they may receive served content 115 to be consumed, e.g. from a content server 114 (e.g. web host), which may operate under the control of a publisher, e.g. to deliver content on one or more channels or platforms. The publishers may sell "space" on their channels for brand owners to display video ads, either via an ad bidding process or by embedding the ads into content.

The served content 115 may thus include media content 104 directly provided by the content servers 114 or sent together with or separately from the served content by an ad server 116, e.g. as a result of an ad bidding process. The brand owner 102 may supply the media content 104 to the content servers 114 and/or the ad server 116 in any conventional manner. The network 112 can be of any type.

In this example, the served content includes code for triggering transmission of contextual attribute data 124 from the client device 106 over the network 112 to an analysis server 130. The code is preferably in the form of a tag 120 in the header of the main page loaded from the domain hosted by the content server 114. The tag 120 operates to load a bootstrapping script which performs a number of functions to enable delivery of information, including the contextual attribute data 124, from the client device 106. These functions are discussed below in more detail. However, for the invention, the primary functions of the tag 120 are to trigger delivery of the contextual attribute data 124 and, where appropriate, a behavioural data stream 122, such as a webcam recording comprising a video or image data from the camera 110 on the client device 106, to the analysis server 130.

The contextual attribute data 124 is preferably analytics data relating to events occurring after the main page is loaded. The analytics data may include any conventionally collected and communicated information for the main page, such as viewability of any element, clicks, scrolls, etc. This analytics data may provide a control baseline against which "incremental" emotional or attention impact when the relevant media content 104 is in view or playback.

As mentioned above, references to "behavioral data" or "behavioral information" herein may refer to visual aspects of a user's response. For example, behavioral data may include facial response, head and body gestures or pose, and gaze tracking. In this example, the behavioural data stream 122 sent to the analysis server 130 may include a user's facial response, e.g. in the form or a video or set of images captured of the user while consuming the media content 104.

In addition to the behavioural data 122 and contextual attribute data 124, the analysis server 130 is arranged to receive the media content 104 itself and a supplemental contextual attribute data stream 126 that comprises analytics data from the video player within which the media content is displayed. The media content 104 may be supplied to the analysis server 130 directly from the brand owner 102 or from a content server 114 or client device 106. The supplemental contextual attribute data stream 126 may be obtained by loading an adaptor for the video player 107 in which the media content 104 is displayed. Alternatively, the video player 107 may have a plug-in to provide the same functionality in the native environment of the video player 107.

The supplemental contextual attribute data stream 126 is obtained for the purpose of synchronising the behavioural data 122 to playback positions within the media content and therefore provide brand measurement and creative level analytics. The supplemental contextual attribute data stream 126 may include viewability, playback event, click, and scroll data associated with the video player.

A separate mechanism for generating the supplemental contextual attribute data stream 126 is provided because the video player 107 may be deployed within an iframe, especially when the rendering of the media content 104 occurs via a third-party ad server 116. In such cases, the adapter must be deployed inside the iframe, where it can cooperate with the functionality of main tag 120 to record and transmit the data to the analysis server 130.

For example, the supplemental contextual attribute data stream 126 may include information relating to user instructions, such a pause/resume, stop, volume control, etc. Additionally or alternatively, the supplemental contextual attribute data stream 126 may include other information about delays or disruptions in the playback, e.g. due to buffering or the like.

In combination, the contextual attribute data stream 124 and the supplemental contextual attribute data stream 126 provide to the analysis server 130 a rich background context that can be related (and in fact synchronised) to a user's response to the piece of media content obtainable from the behavioural data stream 122.

The behavioural data stream 122 may not be obtained for every user that views the media content 104. This may be because the user has not consented to share information, or does not have a suitable camera for recording the behavioral data. Where permission to share information is given, but no behavioural data is obtained, the main tag 120 may nevertheless transmit the contextual attribute information 124, 126 to the analysis server 130. Attentiveness information may be predicted from this information in a manner discussed below.

The bootstrapping script may operate to determine whether or not a behavioural data stream 122 is to be obtained from a given client. This may involve a check on whether or not the user has been selected to participate, e.g. based on random sampling methodology, and/or based on publisher restrictions (e.g. because feedback from only some specific class of audience is required).

The bootstrapping script may operate initially to determine or obtain permissions for sharing the contextual attribute data 124 and the supplemental contextual attribute data 126 to the analysis server 130. For example, if a Consent Management Platform (CMP) exists for the domain in question, the script operates to check for consent from the CMP. It may also operate to check for global opt-out cookies associated with the analysis server or certain domains.

The bootstrapping script may then operate to check whether or not a behavioural data stream 122 is to be obtained. If it is (e.g. because the user has been selected as part of the sample), the bootstrapping script may check the permission APIs of the camera 110 for recording and transmitting a camera feed. Because the behavioural data stream 122 is transmitted with the contextual attribute data from the primary domain page, it is important that the tag for running the bootstrapping script is in the header of primary domain page, rather than any associated iframe.

In one example, the behavioural data stream 122 is a full video recording from the camera 110 that is sent to the analysis server 130 over a suitable real-time communication protocol, such as WebRTC. To optimize page loading speed, the code for the WebRTC recording and on-device tracking is not loaded by the bootstrapping script before the relevant permissions are confirmed. In an alternative approach, the camera feed may be processed locally by the client device, such that only the detected attention, emotion and other signals are transmitted, and no images or video leave the client device. In this approach, some functionality of the analysis server 130 discussed below is distributed to the client device 110.

In general, the function of the analysis server 130 is to convert the essentially free form viewing data obtained from the client devices 106 into a rich dataset that can be used to judge the effectiveness of the media content. As an initial step, the analysis server 130 operates to determine attention data for each user. Attention data can be obtained from the behavioural data stream 122 by using an attention classifier 132, which is an AI-based model that returns a probability that a face on a given webcam frame is showing attention to the content on screen.

The attention classifier 132 can therefore output a time-varying signal that shows the evolution of a user's attention whilst consuming the media content 104. This can be synchronised with the media content 104 itself to enable the detected attentive and distracted states to be matched with what the user was exposed to when consuming the media content. For example, where the media content is a video ad, a brand may be revealed at certain time points or periods within the video. The invention enables these time points or periods to be marked or labelled with attentiveness information.

Similarly, the creative content of a video can be expressed as a stream of keywords associated with different time point or periods within the video. Synchronisation of the keyword stream with the attentiveness signal can allow for correlations between keywords and attention or distraction to be recognised.

The attentiveness signal may also be synchronised with the contextual attribute signal in a similar way, thereby providing a rich dataset of contextual data synchronised with user attention evolution. These datasets, which can be obtained from each user that consumes media content are aggregated and stored in a data store 136, from where they can be queried and further analysed to generate reports, identify correlations and make recommendations, as discussed below.

The contextual attribute data 124 may also be used to give confidence or trust that the output from the attention classifier 132 applies to the relevant content, e.g. by permitting a cross check on what is visible on screen.

The behavioural data stream 122 may also be input to an emotional state classifier 135, which operates to generate a time-varying signal indicative of a user's emotion when consuming the media content. This emotional state signal may thus also be synchronised with the attentiveness signal, which enables the emotions associated with attention (or distraction) also to be assessed and reported.

Where the data received at the analysis server 130 from the client device 106 does not include the behavioural data stream 122, an attentiveness signal can nevertheless be obtained by using an attentiveness predictor 134. The attentiveness predictor 134 is configured to generate or infer attentiveness from the contextual attribute data 124 and the supplemental contextual attribute data 126. The attentiveness predictor 134 may be a rule-based model, that generates a prediction based on statistically modelling of contextual attribute data for which attention data is known. For example, where the contextual attribute data indicates that a frame showing a video ad is not visible on screen (e.g. because it is hidden behind other frames), the rule-based model can determine that no attention is being paid to the video ad.

Additionally of alternatively, the attentiveness predictor may comprise an AI-based model that returns a probability that a user is showing attention to the content on screen based on the contextual attribute data 124 and the supplemental contextual attribute data 126. This model may be trained (and updated) using data from users that have consumed the same media content and for whom behavioural data (or indeed real attention data) and associated contextual attribute data is available. Such a model may provide enhanced attentiveness recognition ability compared with conventional rule- or statistics-based models.

In addition to generating the rich datasets discussed above, the analysis server 130 may be arranged to determine specific attention metrics for a given piece of media content. One example of an attention metric is attention volume, which may be defined as an average volume of attention respondents paid to the media content. For example, an attention volume score of 50% means that throughout the video half of the viewers were attentive to the content on average. The more seconds of attention a video manages to attract from its audience, the higher this score will be. Another example of an attention metric is attention quality, which may be defined as the proportion of the media content for which respondents were continuously attentive, on average. For example, a score of 50% means that on average respondents managed to stay attentive without interruption for half of the video. This metric differs from attention volume since it is not the overall amount of attention that dictates the value of the score, but how attention was distributed along the viewing. Attention quality decreases when respondents have short attention spans, which shows that they are distracted regularly.

The metrics above, or others, can be to determine the extent to which attention was paid to a given viewed instance of delivered media content on a client device. This can be done, for example, by setting a threshold for attention volume and/or attention quality, and determining that attention was paid to the viewed instance if one or both thresholds are exceeded. For the perspective of a brand owner or publisher, an advantage of this feature is that it becomes possible to report not only on number of impressions and number of views of a particular piece of media content, but also to be able to distinguish between views having user attention and views where the user was distracted. The accompanying contextual attribute data then makes it possible to try to understand the levers that drive attention or distraction.

The system includes a report generator 138 that is arranged to query the data store 136 to generate one or more reports 140 that can be served to the brand owner 102, e.g. directly or over the network 112. The report generator 138 may be a conventional computing device or server arranged to query a database on the data store that contains the collected and synchronised data. Some examples of a report 140 are discussed in more detail below with reference to FIGS. 4 and 5.

Figure 2:
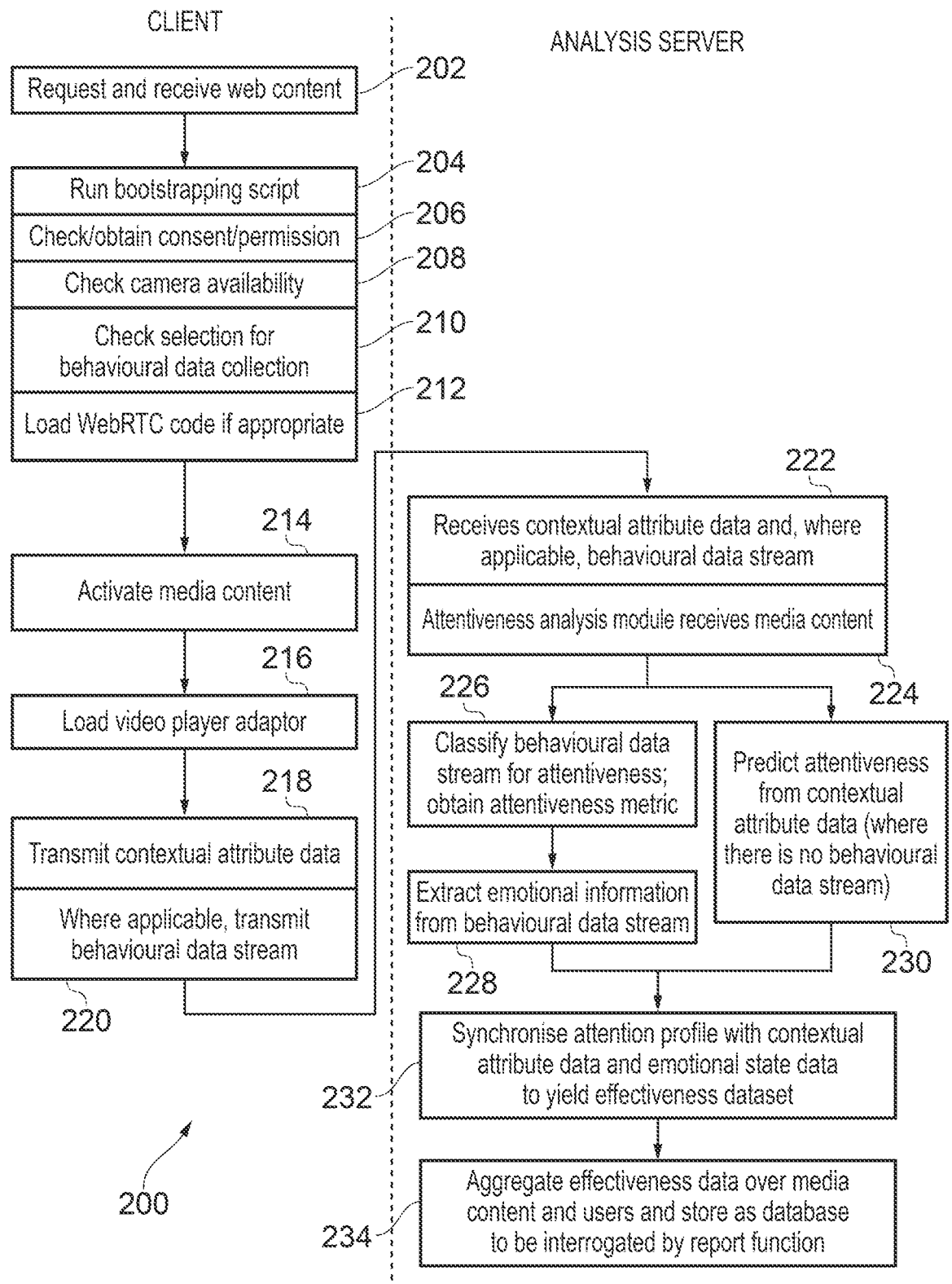
FIG. 2 is a flow diagram of a method of collecting and analysing data that is an embodiment of the invention.

FIG. 2 is a flow chart showing step taken by a client device 106 and the analysis server 130 in a method 200 that is an embodiment of the invention.

The method begins with a step 202 of requesting and receiving, by the client device over a network, web content. Here web content is intended to mean a webpage that can be accessed and loaded from a domain, e.g. hosted by a content server 114 as discussed above.

The webpage includes in its header a tag that contains a bootstrapping script configured to run a number of preliminary checks and processes that enable collection of data from the client device. The method thus continues with a step 204 of running the bootstrapping script. One of the tasks performed by the script is to check for consent or obtain permission to share collected data with the analysis server. This may be done with reference to a Content Management Platform (CMP), if applicable to the domain from which the webpage is obtained. In this case, the bootstrapping script is located after code in the webpage header that initialises the CMP.

The method continues with a step 206 of checking or obtaining permission to share data. This can be done in any conventional manner, e.g. by checking the current status of the CMP, or providing an on-screen prompt. The permission is preferably requested at a domain level, so that repeated requests, e.g. upon accessing additional pages from the same domain are avoided. The method includes a step 208 of checking for camera availability and obtaining consent for data collected from the camera to be transmitted to the analysis server. Where there is no camera, or no consent to transmit data from the camera, the method may still proceed if the user consents to transmitting contextual attribute data. This is the scenario discussed above where there is no behavioural data stream.

If a camera is available, and consent for transmitting data from the camera is given, the method continues with a step 210 of checking whether or not the user has been selected or sampled for behavioural data collection. In other embodiments this step 210 may occur before the step 208 of checking camera availability.

In some circumstances, all users with available cameras may be selected. However, in other examples, the users may be selected either to ensure that a suitable (e.g. random or pseudo-random) range of data is received by the analysis server 130, or to meet a requirement set by a brand owner or publisher (e.g. to collect data only from one population sector). In another example, the ability to select users may be used to control the rate of data received by the analysis server. This may be useful if there are problems with or restrictions on network bandwidth.

When a user gives consent for and is selected to transmit behavioural data from the camera, the method continues with a step 212 of loading appropriate code to permit sharing of the camera data through the webpage. In one example, transmitting the behavioural data is done using the WebRTC protocol. It is preferable to defer loading the code for behavioural data transmission until after it is determined that the behavioural data is in fact to be transmitted. Doing so saves on network resources (i.e. unnecessary traffic) and facilitates a rapid initial page load.

Sometime after accessing the webpage and running the bootstrapping script, the method continues with a step 214 of activating, at the client device, media content. Activating media content may mean initiating playback of media that is embedded in the webpage, or encountering an ad space on the webpage that causes playback of a video ad received from an ad server, e.g. resulting from a conventional ad bidding process.

Playback of the media content may be done by executing a media player, e.g. a video player or the like. The media player may be embedded in the webpage, and configured to display the media content in an iframe within the webpage. Examples of suitable media players include Windows Media Player, QuickTime Player, Audacious, Amarok, Banshee, MPlayer, Rhythmbox, SMPlayer, Totem, VLC, and xine, or online video players, such as JW Player, Flowplayer, VideoJS and Brightcove, etc.

As discussed above, it is desirable to transmit to the analysis server contextual attribute data concerning the behavioural and control of the media player, i.e. analytics data for the media player. In order to achieve this, the method continues with a step 216 of loading an adaptor for the media player (or, if present, executing a plug-in of the media player) that is arranged to communicate the media player analytics data to the webpage, whereupon it can be transmitted to the analysis server.

The method continues with a step 218 of transmitting the contextual attribute data and a step 220 of transmitting, where applicable, the behavioural data to the analysis server. Where the camera is available and consent is given, this means that the data transmitted to the analysis server comes from three sources:

(1) behavioural data from camera—this is typically images or video from the camera itself. However, as discussed above, it is also possible that the client device itself will perform some preliminary analysis on the raw image data, e.g. to measure attention and/or to identify emotions. In this example, the behavioural data transmitted to the analysis server may be the attention and emotional state data; no image data need be transmitted;

(2) contextual data from webpage—this is typically analytics data associated with the domain from which the webpage is accessed; and (3) contextual data from media player—this is typically analytics data associated with media player on which the media content is displayed.

The method now moves to the actions taken at the analysis server, which commences with a step 222 of receiving that data discussed above from the client device. The method also includes a step 224 of acquiring, by the analysis server, the media content that is the subject of the collected behavioural data and contextual attribute data. The analysis server may obtain the media content directly from the brand owner or from a content server, e.g. based on an identifier transmitted by the client device. Alternatively, the analysis server may have a local store of media content.

The method continues with a step 226 of classifying the behavioural data for attentiveness. In this step, individual images from the data captured by the camera on the client device are fed to the attention classifier, which evaluates a probability that image displays a user who is paying attention to the media content. An output of the attention classifier may thus be an attention profile for the user for the media content, where the attention profile indicating evolution of attention with time over the duration of the media content. In another example, the classifier may be binary, i.e. may generate an output for each frame that is either "attentive" or "distracted". A attention profile can also be generated for such a two-state solution. In another example, the classifier may be trained to include labels for input data from which an attentiveness parameter cannot be obtained. For example, the classifier may be able to distinguish between a state in which a user is present, but where the user's face cannot be read enough to ascertain if they are attentive or not, and an unknown state, which may correspond to a situation where no relevant signal is obtained from the camera). The classifier may thus output labels such as: "attentive", "non-attentive", "present" and "unknown".

The attention classifier or the analysis server may also be arranged to generate one or more attention metrics for that particular viewing instance of the media content. The attention metrics may be or include the attention volume and attention quality metrics discussed above.

The method continues with a step 228 of extracting emotional state information from the behavioural data stream. This may be done by an emotion state classifier, and can be performed in parallel with step 226. An output of this step may be an emotional state profile that indicates evolution of one or more emotional states with time over the duration of the media content.

As discussed above, the behavioural data stream may comprise image data captured by the camera, where the image data is a plurality of image frames showing facial images of the user. Where the image frames depict facial features, e.g. mouth, eyes, eyebrows etc. of a user. The facial features may provide descriptor data points indicative of position, shape, orientation, sharing, etc., of a selected plurality of the facial landmarks. Each facial feature descriptor data point may encode information that is indicative of a plurality of facial landmarks. Each facial feature descriptor data point may be associated with a respective frame, e.g. a respective image frame from the time series of image frames. Each facial feature descriptor data point may be a multi-dimensional data point, each component of the multi-dimensional data point being indicative of a respective facial landmark.

The emotional state information may be obtained directly from the raw behavioural data input, of from descriptor data points extracted from the image data, or from a combination of the two. For example, the plurality of facial landmarks may be selected to include information capable of characterizing user emotion. In one example, the emotional state data may be determined by applying a classifier to one or more facial feature descriptor data points in one image or across a series of images. In some examples, deep learning techniques can be utilised to yield emotional state data from the raw data input.

The user emotional state may include one or more emotional states selected from anger, disgust, fear, happiness, sadness, and surprise.

Where the data received by the analysis server does not include behavioural data, the above steps 226, 228 may be omitted. Instead, the method includes a step 230 of predicting attention data using the contextual attribute data. In this step 230, the contextual attribute data is fed to an attention predictor, which evaluates a probability that image displays a user who is paying attention to the media content. Whereas the attention classifier is an AI-based model trained on annotated facial image (discussed below in more detail), the attention predictor is an AI-based model trained on contextual attribute data for which attention data is available. The attention predictor is therefore able to transform information relating to the environment in which the viewed instance of media content occurs, and the interaction of the user with the client device during that viewed instance.

An output of the attention predictor may thus be similar to the attention classifier, e.g. an attention profile for the user for the media content, where the attention profile indicating evolution of attention with time over the duration of the media content. The output from either or both of the attention classifier and the attention predictor may be weighted, e.g. depending on a level of confidence associated with the collected data. For example, the output of the attention classifier may be weighted based on a detected angle of the camera from which behavioural data is collected. The confidence in the output may be less if the user is not face on to the camera.

The method continues with a step 232 of synchronising the attention profile 232 with the corresponding contextual attribute data and emotional state data, in order to generate a rich "effectiveness" dataset, in which the context of the periods of attention and distraction in the attention profile are associated with various elements of the associated context or emotional state data.

The method continues with a step 234 of aggregating the effectiveness dataset obtaining for a plurality of viewed instances of the media content from a plurality of client devices (e.g. different users). The aggregated data is stored on a data store from where it can be queried to generate reports of the types discussed below with reference to FIGS. 4 and 5.

Figure 3:
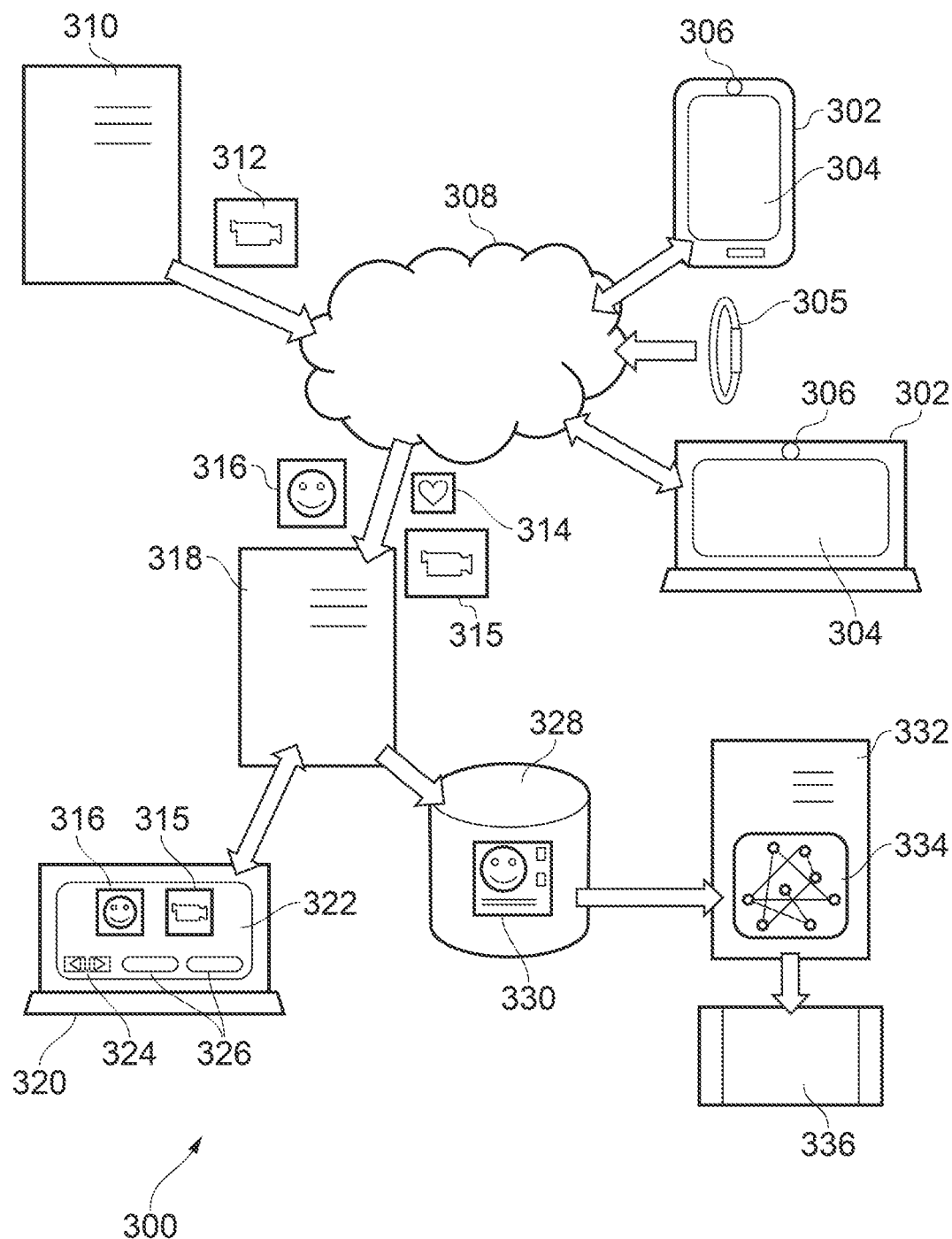
FIG. 3 is a schematic diagram of a data collection and analysis system for generating an attentiveness classifier suitable for use in the invention.

FIG. 3 is a schematic diagram of a data collection and analysis system 300 for generating an attention classifier suitable for use in the invention. It can be understood that the system in FIG. 3 illustrates components for performing collection and annotation of data, as well as for subsequent use of that data in generating and utilising the attention classifier.

The system 300 is provided in a networked computing environment, where a number of processing entities are communicably connected over one or more networks. In this example, the system 300 comprises one or more client devices 302 that arranged to playback media content, e.g. via speakers or headphones and a display 304. The clients devices 302 may also comprise or be connected to behavioural data capture apparatus, such as webcams 306, microphones, etc. Example client devices 302 include smartphones, tablet computers, laptop computers, desktop computers, etc.

The system 300 may also comprise one of more client sensors units, such as a wearable device 305 for collecting physiological information from a user while they consume media content on a client device 302. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

The client devices 302 are communicably connected over a network 308, such that they may receive media content 312 to be consumed, e.g. from a content provider server 310.

The client devices 302 may further be arranged to send collected behavioural information over the network for analysis or further processing at a remote device, such as analysis server 318. As mentioned above, references to "behavioral data" or "behavioral information" herein may refer to visual aspects of a user's response. For example, behavioral information may include facial response, head and body gestures or pose, and gaze tracking.

In this example, the information sent to the analysis server 318 may include a user's facial response 316, e.g. in the form or a video or set of images captured of the user while consuming the media content. The information may also include the associated media content 315 or a link or other identifier that enables the analysis server 318 to access the media content 312 that was consumed by the user. The associated media content 315 may include information concerned the manner in which the media content was played back at the client device 302. For example, the associated media content 315 may include information relating to user instructions, such a pause/resume, stop, volume control, etc. Additionally or alternatively, the associated media content 315 may include other information about delays or disruptions in the playback, e.g. due to buffering or the like. This information may correspond to (and be obtained in a similar manner to) the analytics data from the media player discussed above. The analysis server 318 may thus effectively receive a data stream comprises information relating to a user's response to the piece of media content.

The information sent to the analysis server 318 may also include physiological data 314 obtained for the user while consuming the media content. The physiological data 314 may be transmitted directly by the wearable device 305, or the wearable device 305 may be paired with one or more client devices 302, which are arranged to receive and send on data from the wearable device 305. The client device 302 may be arranged to process raw data from the wearable device, whereby the physiological data 314 transmitted to the analysis server 318 may comprise data already processed by the client device 302.

In the present example, the purpose of collecting information about the user's response to the media content is to enable that response to be annotated with attentiveness labels. In one example, this annotation process may comprise establishing a time series of attentiveness scores that map onto a time series of one or more behavioural characteristic parameters received at the analysis server 318. For example, the time series of attentiveness scores may be associated with the images or video of the user collected while the user was consuming the media content. Other behavioural characteristic parameters, e.g. emotional state information, physiological information, etc., may be synchronised with the images or video of the user. An output of the annotation process may thus be a rich data stream representative of the user's behavioural characteristics, including attentiveness, in response to the media content.

The system 300 provides an annotation tool 320 that facilitates execution of the annotation process. The annotation tool 320 may comprise a computer terminal in communication (e.g. networked communication) with the analysis server 318. The annotation tool 320 includes a display 322 for showing a graphical user interface to a human annotator (not shown). The graphical user interface may take many forms. However, in may usefully comprise a number of functional elements. Firstly, the graphical user interface may present collected user response data 316 (e.g. the set of facial images or video showing the user's facial movements) alongside associated media content 315 in a synchronised manner. In other words, the user's facial reactions are displayed simultaneously with the associated media content that the consumer was watching. In this manner the annotator can be aware (consciously or subconsciously) of the context in which the user's response occurred. In particular, the annotator may be able to adjudge attentiveness based on a reaction to events in the associated media content, or may be sensitive to external events that may have distracted the user.

The graphical user interface may include a controller 324 for controlling playback of the synchronised response data 316 and associated media content. For example, the controller 324 may allow the annotator to play, pause, stop, rewind, fast forward, backstep, forward step, scroll back, scroll forward or the like through the displayed material.

The graphical user interface may include one or more score applicators 326 for applying an attentiveness score to a portion or portions of the response data 316. In one example, a score applicator 326 may be used to apply an attentiveness score to a period of a video or set of image frames corresponding to a given time period of the user's response. The attentiveness score may have any suitable format. In one example it is binary, i.e. a simple yes/no indication of attentiveness. In other examples, the attentiveness score may be selected from a set number of predetermined levels (e.g. high, medium, low), or may be chosen from a numerical range (e.g. a linear scale) between end limits that represent no attention (or absence) and high attention respectively.

Simplifying the annotation tool may be desirable in terms of expanding the potential annotator pool. The simpler the annotation process, the less training is required for annotators to participate. In one example, annotated data may be harvested using a crowd-sourcing approach.

The annotation tool 320 may thus represent a device for receiving a time series of data indicative of a user's attentiveness while consuming a piece of media contact. The attention data may be synchronised (e.g. by virtue of the manner in which the score is applied) with the response data 316. The analysis server 318 may be arranged to collate or otherwise combine the received data to generate attentiveness-labelled behavioural data 330 that can be stored in a suitable storage device 328.

The attention data from multiple annotators may be aggregated or otherwise combined to yield an attentiveness score for a given response. For example, attention data from multiple annotators may be averaged over portions of the media content.

In one embodiment, the level of agreement between multiple annotators may itself be used as way of quantifying attentiveness. For example, the annotation tool 320 may permit each annotator with a binary option to score the response data: the user is either (a) attentive, or (b) not attentive. In other examples, the annotation tool may include states correspond to the labels "present" and "unknown" discussed above. The annotator tool 320 may present one or more reasons fields in which an annotator can provide a reason for the binary selection. There may be a drop down list or the like of predetermined reasons from which field may be populated. The predetermined reasons may include common reasons for attention or inattention, e.g. "turning head away", "not looking at screen", "talking", etc. The field may also permit free text entry. The attention data from each annotator may include the results of the binary selection for various periods within the response data, together with associated reasons. The reasons may be used to assess circumstances in which there is a high degree of disagreement between annotators, or where an attentiveness model outputs a result that does not agree with observation. This can happen, for example, where similar facial movements correspond to different behaviours (e.g. talking/eating, etc.).

The analysis server 318 may be arranged to receive the attention data from multiple annotators. The analysis server 318 may generate combined attention data from the different sets of attention data. The combined attention data may comprise an attentiveness parameter that is indicative of level of positive correlation between the attention data from the plurality of annotators. In other words, the analysis server 318 may output a score that quantifies the level of agreement between the binary selections made by the plurality of annotators across the response data. The attentiveness parameter may be a time-varying parameter, i.e. the score indicating agreement may vary across the duration of the response data to indicate increasing or decreasing correlation.

In a development of this concept, the analysis server 318 may arranged to determine and store a confidence value associated with each annotator. The confidence value may be calculated based on how well the annotators individual scores correlate with the combined attention data. For example, an annotator who regularly scores in the opposite direction to the annotator group when taken as a whole may be assigned a lower confidence value than an annotator who is more often in line. The confidence values may be updated dynamically, e.g. as more data is received from each individual annotator. The confidence values may be used to weight the attention data from each annotator in the process of generating the combined attention data. The analysis server 318 may thus exhibit the ability to 'tune' itself to more accurate scoring.

The attentiveness-labelled behavioural data 330 may include the attentiveness parameter. In other words, the attentiveness parameter may be associated with, e.g. synchronised or otherwise mapped to or linked with, events in the data stream or media content.

The attentiveness-labelled behavioural data 330 may include any one or more of: the original collected data 316 from the client device 302 (e.g. the raw video or image data, which is also referred to herein as the response data); the time series of attention data; time series data corresponding to one or more physiological parameters from the physiological data 314; and emotional state data extracted from the collected data 316.

The collected data may be image data captured at each of the client device 302. The image data may include a plurality of image frames showing facial images of a user. Moreover, the image data may include a time series of image frames showing facial images of a user.

Where the image frames depict facial features, e.g. mouth, eyes, eyebrows etc. of a user, and each facial feature comprises a plurality of facial landmarks, the behavioural data may include information indicative of position, shape, orientation, shading etc. of the facial landmarks for each image frame.

The image data may be processed on respective client devices 302, or may be streamed to the analysis server 318 over the network 308 for processing.

The facial features may provide descriptor data points indicative of position, shape, orientation, sharing, etc., of a selected plurality of facial landmarks. Each facial feature descriptor data point may encode information that is indicative of a plurality of facial landmarks. Each facial feature descriptor data point may be associated with a respective frame, e.g. a respective image frame from the time series of image frames. Each facial feature descriptor data point may be a multi-dimensional data point, each component of the multi-dimensional data point being indicative of a respective facial landmark.

The emotional state information may be obtained directly from the raw data input, from the extracted descriptor data points or from a combination of the two. For example, the plurality of facial landmarks may be selected to include information capable of characterizing user emotion. In one example, the emotional state data may be determined by applying a classifier to one or more facial feature descriptor data points in one image or across a series of images. In some examples, deep learning techniques can be utilised to yield emotional state data from the raw data input.

The user emotional state may include one or more emotional states selected from anger, disgust, fear, happiness, sadness, and surprise.

The creation of the attentiveness-labelled behavioural data represents a first function of the system 300. A second function, described below, is in the subsequent use of that data to generate and utilise an attentiveness model for the attention classifier 132 discussed above.

The system 300 may comprise a modelling server 332 in communication with the storage device 328 and arranged to access the attentiveness-labelled behavioural data 330. The modelling server 332 may connect directly to the storage device 328 as shown in FIG. 3 or via a network such as network 308.

The modelling server 332 is arranged to apply machine learning techniques 334 to a training set of attentiveness-labelled behavioural data 330 in order to establish a model 336 for scoring attentiveness from unlabelled response data, e.g. response data 316 as originally received by the analysis server 318. The model may be established as an artificial neural network trained to recognise patterns in collected response data that are indicative of high levels of attentiveness. The model can therefore be used to automatically score collected response data, without human input, for attentiveness. An advantage of this technique is that the model is fundamentally based on direct measurements of attentiveness that are sensitive to contextual factors that may be missed by measurements or engagement or attentiveness that rely on certain predetermined proxies.

In one example, the model 336 combines two types of neural network architectures: a Convolutional Neural Network (CNN) and a Long Short-Term Memory neural network (LSTM).

The CNN part was trained on images of respondents taken from individual video frames. The CNN's last layer representation is used in turn to generate temporal sequences for training the LSTM.

Combining these two architectures builds a model that both: (i) learns useful spatial information extracted from images of faces and upper body with the CNN; and (ii) learns useful temporal patterns in facial expressions and gestures with the LSTM that help the model decide if it is looking at an attentive or distracted face.

In one example, the attentiveness-labelled behavioural data 330 used to generate the attentiveness model 336 may also include information about the media content. This information may relate to how the media content is manipulated by the user, e.g. paused or otherwise controlled. Additionally or alternatively, the information may include data about the subject matter of the media content on display, e.g. to give context to the collected response data.

Herein the piece of media content may be any type of user-consumable content for which information regarding user feedback is desirable. The invention may be particular useful where the media content is a commercial (e.g. video commercial or advert), where user engagement or attention is likely to be closely linked to performance, e.g. sales uplift or the like. However, the invention is applicable to any kind of content, e.g. any of a video commercial, an audio commercial, a movie trailer, a movie, a web advertisement, an animated game, an image, etc.

Figure 4:
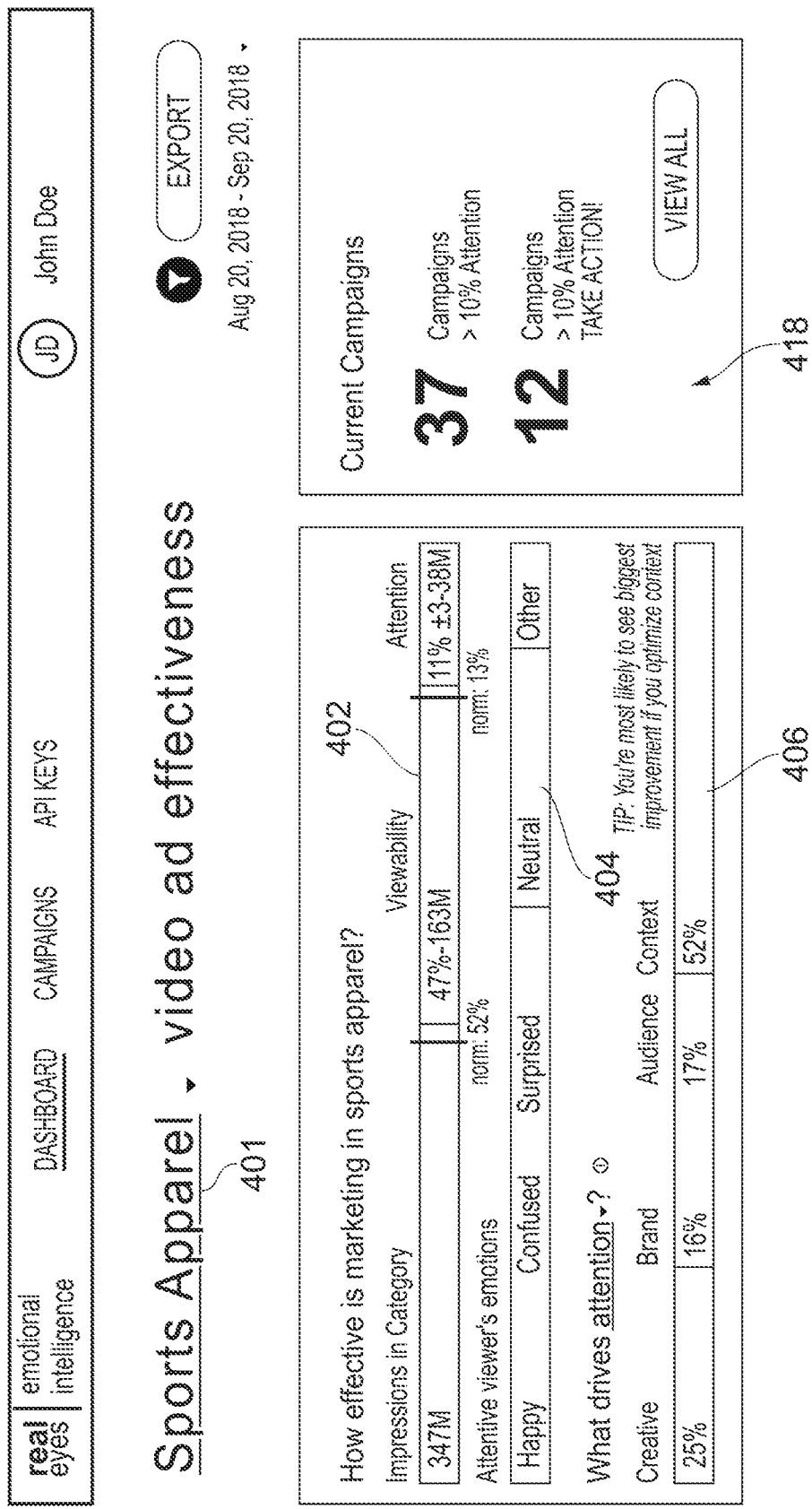
FIG. 4 is a screenshot of a reporting dashboard that presents data resulting from execution of the method of FIG. 2.
Figure 4:
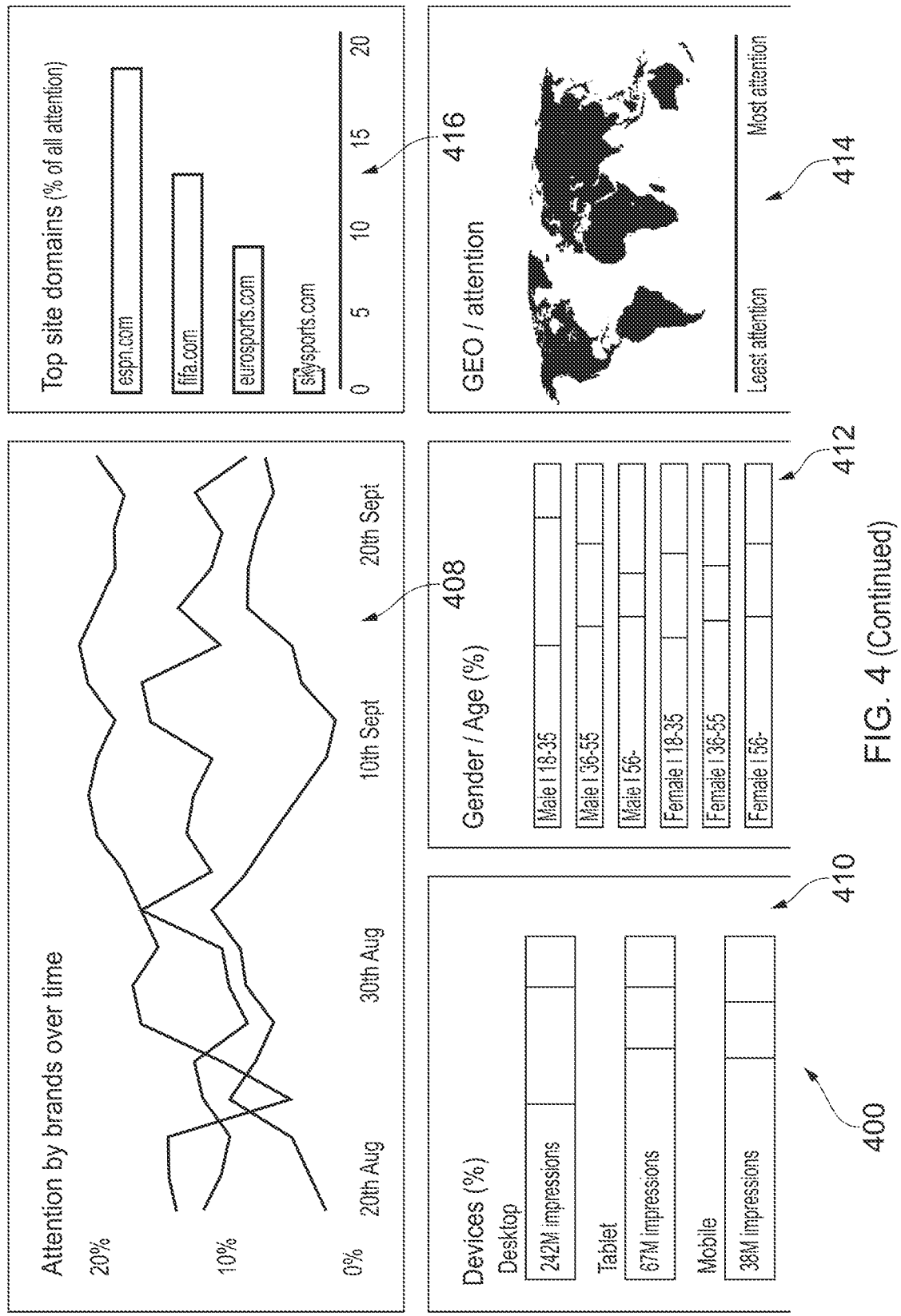

FIG. 4 is a screenshot of a reporting dashboard 400 that comprises a presentation of the rich effectiveness data stored on the data store 136 of FIG. 1 for a range of different media content, e.g. a group of ads in a common field. The common field may be indicated by main heading 401, which is shown as "sports apparel" in FIG. 4, but may be changed, e.g. by the user selecting from a drop down list.

The dashboard 400 includes an impression categorisation bar 402, in which the relative proportion of total served impressions which were (i) viewable (i.e. visible on screen), and (ii) viewable by user with an attention score above a predetermined threshold (i.e. an "attentive viewer"). Norms may be marked on the bar to shown how the viewability and attentiveness proportions compare with expected performance.

The dashboard 400 may further include a relative emotional state bar 404, which shows the relative strength of the emotional states detected from attentive viewers.

The dashboard 400 further includes a driver indicator bar 406, which in this example shows the relative amount by which different contextual attribute categories are correlated to detected attention. Each of the contextual attribute categories (e.g. creative, brand, audience and context) may be selectable to provide a more detailed breakdown of the factors that contribute to that category. For example, the "creative" category may relate to information presented in the media content. The contextual attribute data may include a content stream that describes the main items that are visible at any point of time in the media content. In FIG. 4, the driver indicator bar 406 shows the correlation of categories to attention. However, it may be possible to select other feature for which the relative strength of correlation with the categories is of interest, such as particular emotional states.

The dashboard 400 further includes a brand attention chart 408, which shows the evolution over time of the level of attention achieved by various brands in the common field indicated in main heading 401.

The dashboard 400 further includes a series of charts that break down the impression categorisation by contextual attribute data. For example, chart 410 breaks down the impression categorisation by viewing device type, while chart 412 breaks down the impression categorisation using gender and age information.

The dashboard 400 further includes a map 414 in which relative attention is illustrated using location information from the contextual attribute data.

The dashboard 400 further includes a domain comparison chart 416 which compares the amount of attention associated with the web domain from which the impressions are obtained.

Finally, the dashboard 400 may further comprise a summary panel 418, which classifies campaigns covered by the common field according to a predetermined attention threshold. The threshold is 10% in this example, which means that 10% of impressions are detected as having an attentive viewer.

Figure 5:
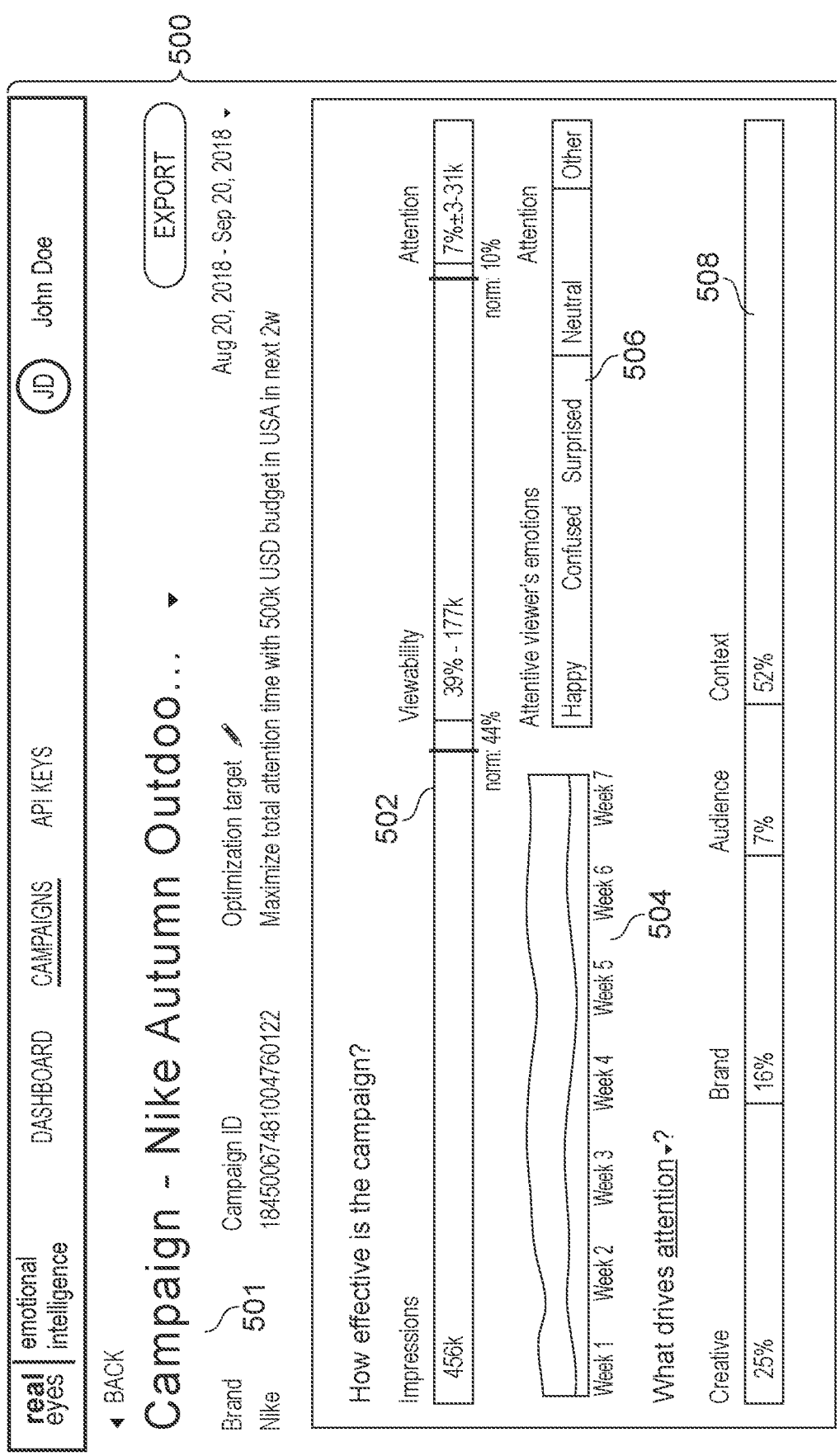
FIG. 5 is a screenshot of a ad campaign report that presents data resulting from execution of the method of FIG. 2.
Figure 5:
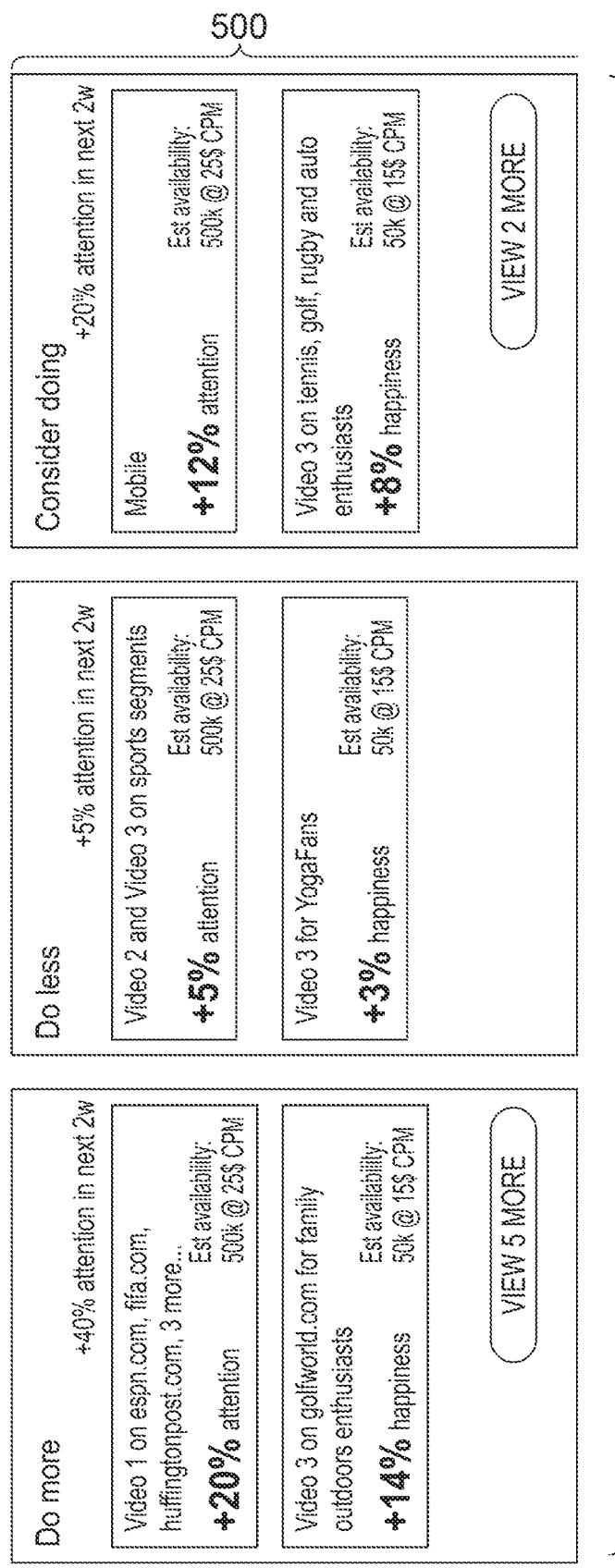
Figure 5:
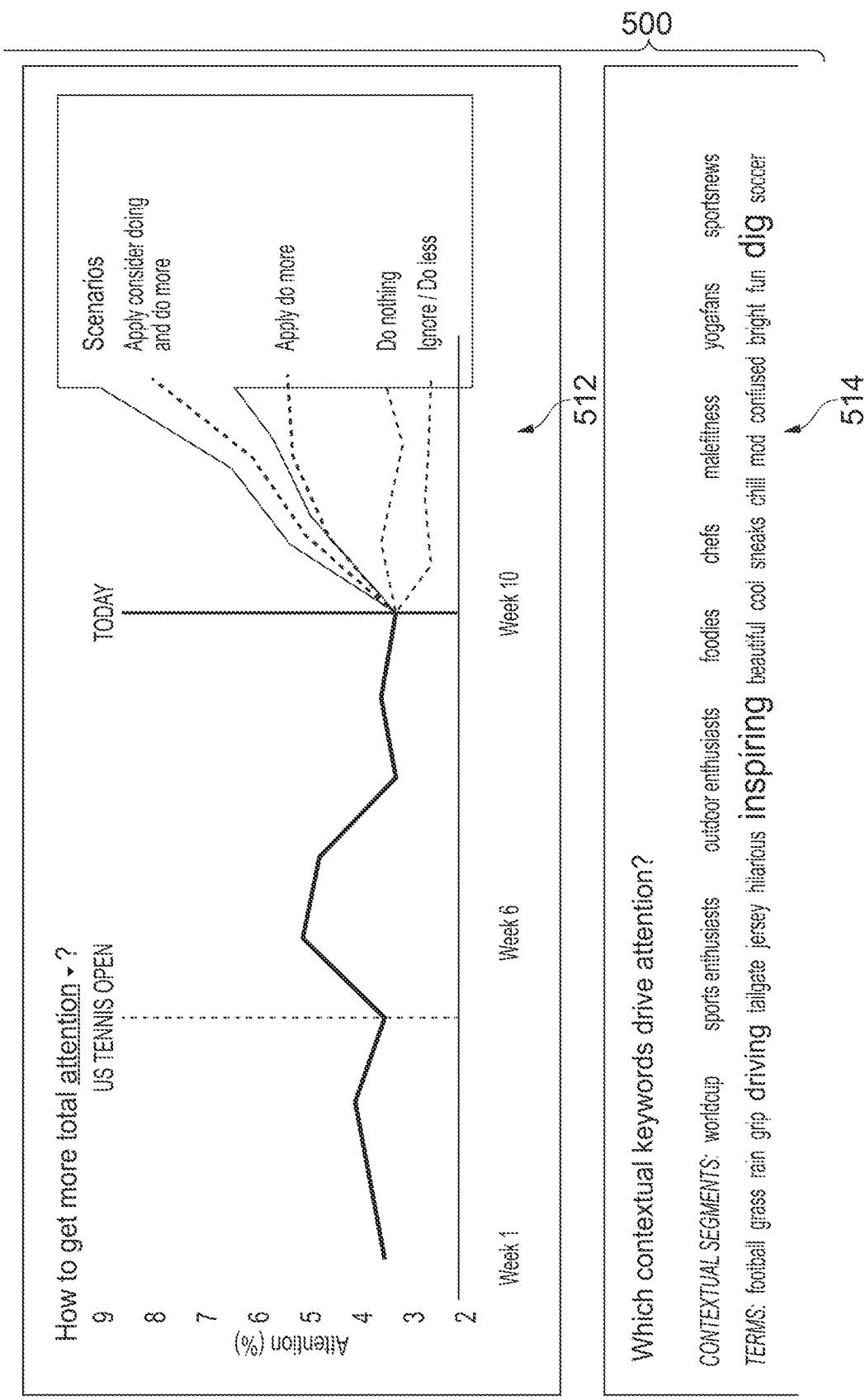

FIG. 5 is a screenshot of an ad campaign report 500 that comprises a presentation of the rich effectiveness data stored on the data store 136 of FIG. 1 for a specific ad campaign 501, which may be represented by a single piece of media content (e.g. video ad) or a group of related pieces of media content.

The ad campaign report 500 may include an impression categorisation bar 502, which indicates the relative proportion of total served impressions under the selected campaign which were (i) viewable (i.e. visible on screen), and (ii) viewable by user with an attention score above a predetermined threshold (i.e. an "attentive viewer"). Norms may be marked on the bar to shown how the viewability and attentiveness proportions compare with expected performance.

The ad campaign report 500 may further comprise a chart 504 showing evolution of the impression categorisation bar over time.

The ad campaign report 500 may further include a relative emotional state bar 506, which shows the relative strength of the emotional states detected from attentive viewers.

The ad campaign report 500 further includes a driver indicator bar 508, which in this example shows the relative amount by which different contextual attribute categories are correlated to detected attention. Each of the contextual attribute categories (e.g. creative, brand, audience and context) may be selectable to provide a more detailed breakdown of the factors that contribute to that category. For example, the "creative" category may relate to information presented in the media content. The contextual attribute data may include a content stream that describes the main items that are visible at any point of time in the media content. In FIG. 5, the driver indicator bar 508 shows the correlation of categories to attention. However, it may be possible to select other feature for which the relative strength of correlation with the categories is of interest, such as particular emotional states.

The ad campaign report 500 further comprises a recommendations panel 510, in which various suggestions for adapting or maintaining the campaign strategy are provided. Each suggestion includes an associated cost and a predicted effect on attention for the campaign. The predictions are made using the detected information for that campaign. The suggestions may be driven by a predetermined campaign optimisation target.

The ad campaign report 500 further comprises a projection panel 512, which tracks past performance of the campaign and illustrates the effect of carrying out suggestions from the recommendations panel 510.

Finally, the ad campaign report 500 may further comprise a keyword display panel 514, in which data from the contextual attribute data is displayed. The data may include segment data that is used to identify different user types, and/or common terms that appear in the contextual attribute data.

The ad campaign report 500 may be used to control a programmatic advertising campaign. The control may be done manually, e.g. by adapting instructions to a DSP based on the recommendations provided on the report. However, it may be particular useful to implement automated adjustment of the programmatic advertising instructions to effectively establish an automated feedback loop that optimises the programmatic advertising strategy to meet the campaign objective.

The term "programmatic advertising" is used herein to refer to an automated process for buying digital advertising space, e.g. on webpages, online media players, etc. Typically the process involves real-time bidding for each advertising slot (i.e. each available ad impression). In programmatic advertising, a DSP operates to automatically select a bid in response to an available ad impression. The bid is selected based in part on a determined level of correspondence between a campaign strategy supplied to the DSP by an advertiser and contextual information about the ad impression itself. The campaign strategy identifies a target audience, and the bid selection process operates to maximise the likelihood of the ad being delivered to some within that target audience.

In this context, the present invention can be used as a means of adjusting, in real time and preferably in an automated manner, the campaign strategy that is provided to the DSP. In other words, the recommendations that are output from the analysis server may be used to adjust the definition of the target audience for a given ad campaign.

Figure 6:
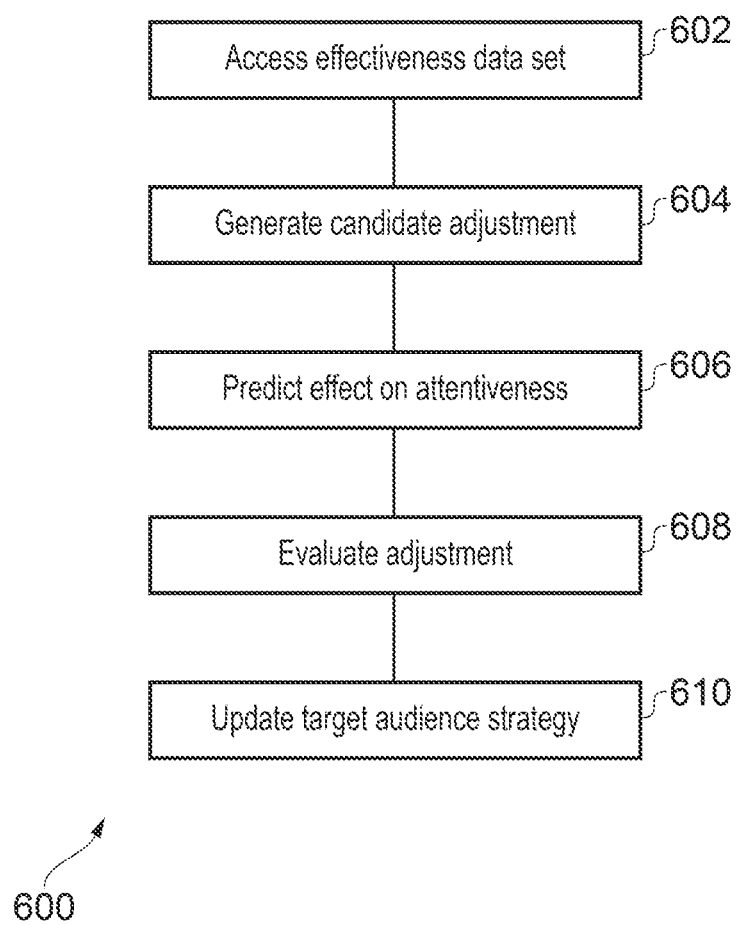
FIG. 6 is a flow diagram of an ad campaign optimisation method according to another aspect of the invention.

FIG. 6 is a flow diagram of a method 600 for optimising a digital advertising campaign. The method is applicable to programmatic advertising techniques, in which the digital advertising campaign has a defined objective and a target audience strategy that aims to achieve that objective. The target audience strategy may form the input to a demand-side platform (DSP) tasked with delivered advertising content to users in a manner that fulfils the defined objective.

The method 600 begins with a step 602 of accessing an effectiveness data set that expresses evolution over time of an attentiveness parameter during playing of a piece of advertising content belonging to a digital advertising campaign to a plurality of users. The effectiveness data set may be of the type discussed above, wherein the attentiveness parameter is obtained by applying behavioural data collected from each user during playing of the piece of advertising content to a machine learning algorithm trained to map behavioural data to the attentiveness parameter.

The method continues with a step 604 of generating a candidate adjustment to the target audience strategy associated with the digital advertising campaign. The candidate adjustment may vary any applicable parameter of the target audience strategy. For example, it may alter demographic or interest information of the target audience. A plurality of candidate adjustments may be generate. The candidate adjustment may be generated based on information from the effectiveness data set for the digital ad campaign. For example, the candidate adjustment may seek to increase the influence of portions of the target audience for which the attentiveness parameter is relatively high, or reduce the influence of portions of the target audience for which the attentiveness parameter is relatively low.

The method continues with a step 606 of predicting an effect on the attentiveness parameter of applying the candidate adjustment. This may be done in the manner discussed above with reference to FIG. 5.

The method continues with a step 608 of evaluating the predicted effect against a campaign objective for the digital advertising campaign. Again, this may be done in the manner discussed above with reference to FIG. 5. The campaign objective may be quantified by one or more parameters. The evaluating step thus compares the predicted values of those parameters against current values for the digital advertising campaign. In one example, the campaign objective may be concerned with maximising attention, and hence an improvement to the target audience strategy would manifest as an increase in the attentiveness parameter.

The method continues with a step 610 of updating the target audience strategy with the candidate adjustment if the predicted effect improves performance against the campaign objective by more than a threshold amount. In the example above, this may be an improvement in the attentiveness parameter (e.g. attention share realised by the ad campaign) above a threshold amount. The updating may be performed automatically, i.e. without human intervention. As such, the target audience strategy may be automatically optimised.

As discussed above, the present invention may find use in measuring the effectiveness of advertising. However, it may also find use in other spheres.

For example, the invention may find use in the evaluation of online educational materials, such as video lectures, webinars, etc. It may also be used to measure attention to locally displayed written text, survey questions, etc. In this context it can be used to assess the effectiveness of the content itself or of the individual trainee, for example, if they have been paying sufficient attention to the training material before they are allowed to take an exam.

In another example, the invention may be used in gaming application, either running locally on the client device, or online, with single or multiple participants. Any aspect of gameplay may provide displayed content for which attention is measurable. For example, the invention may be used to understand if a certain episode of the game is obtained a desired or required levels of attention or emotional response. Moreover, the invention may be used as a tool to direct and measure the effectiveness of changes to gameplay.

The invention claimed is:

1. A computer-implemented method of collecting data for determining attention paid to a display of content, the method comprising:
   displaying content on a client device;
   transmitting, from the client device over a network to an analysis server, contextual attribute data that is indicative of an interaction of a user with the client device during display of the content;
   collecting, at the client device, behavioural data of the user during display of the content;
   applying the behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content;
   synchronising, at the analysis server, the attention data with the contextual attribute data to generate an effectiveness data set that links evolution over time of the attentiveness parameter with corresponding contextual attribute data obtained during display of the content; and
   storing the effectiveness data set in a data store,
   wherein the method further comprises, upon determining that no behavioural data is available from the client device:
      applying the contextual attribute data to a prediction algorithm to generate predicted attention data for the user, wherein the prediction algorithm is a machine learning algorithm trained to map contextual attribute data to an attentiveness parameter, and wherein the predicted attention data is indicative of variation of the attentiveness parameter over time during display of the content; and
      synchronising the predicted attention data with the contextual attribute data to generate a predicted effectiveness data set that links evolution over time of the attentiveness parameter with corresponding contextual attribute data obtained during display of the content.

2. The computer-implemented method of claim 1, wherein the displayed content comprises media content, and wherein the method further comprises:
   playing, using a media player application running on the client device, the media content; and
   the contextual attribute data is further indicative of an interaction of the user with the media player application during playing of the media content.

3. The computer-implemented method of claim 2, wherein the media player application comprises an adaptor module configured to transmit, to the analysis server over the network, control analytics data for the media player application, and wherein the method comprises executing the adaptor module upon receiving the media content to be displayed.

4. The computer-implemented method of claim 1, wherein displaying the content comprises:
   accessing, by the client device over the network, a webpage on a web domain hosted by a content server;
   receiving, by the client device over the network, the content to be displayed by the webpage,
   wherein the contextual attribute data is further indicative of an interaction of the user with the webpage during display of the content.

5. The computer-implemented method of claim 4, wherein accessing the webpage includes obtaining a contextual data initiation script for execution on the client device, and wherein the method further includes:
   injecting, by an intermediary on the network between the content server and client device, the contextual data initiation script into source code of the webpage; and
   executing the contextual data initiation script at the client device.

6. The computer-implemented method of claim 5, wherein obtaining the contextual data initiation script comprises:
   transmitting, by the client device, an ad request; and
   receiving, from an ad server, a video ad response in response to the ad request,
   wherein the contextual data initiation script is included in the video ad response.

7. The computer-implemented method of claim 1, wherein applying the behavioural data to the classification algorithm occurs on the client device, and the method further comprises transmitting, by the client device, the attention data over the network to the analysis server.

8. The computer-implemented method of claim 1 further comprising transmitting, by the client device, the behavioural data over the network to the analysis server, wherein applying the behavioural data to the classification algorithm occurs at the analysis server.

9. The computer-implemented method of claim 1, wherein collecting, at the client device, behavioural data of the user comprises capturing images of the user using a camera, and wherein the classification algorithm operates to evaluate the attentiveness parameter for each image in a plurality of images of the user captured during the playing of the media content.

10. The computer-implemented method of claim 1 further comprising:
    applying the behavioural data to an emotional state classification algorithm to generate emotional state data for the user, wherein the emotional state classification algorithm is a machine learning algorithm trained to map behavioural data to a emotional state data, and wherein the emotional state data is indicative of a variation over time in a probability that the user has a given emotional state during playing of the media content; and
    synchronising the emotional state data with the attention data, whereby the effectiveness data set further comprises the emotional state data.

11. The computer-implemented method of claim 10, wherein the content is obtained and displaying by an app running on the client device, and wherein the method further comprises:

determining, by the app running on the client device, an action based on the emotional state data and attentiveness parameter data.

12. A computer-implemented method of collecting data for determining attention paid to a display of content, the method comprising:

displaying content on a client device, wherein displaying the content comprises:

accessing, by the client device over the network, a webpage on a web domain hosted by a content server, wherein accessing the webpage includes obtaining a contextual data initiation script for execution on the client device; and receiving, by the client device over the network, the content to be displayed by the webpage;

injecting, by an intermediary on the network between the content server and client device, the contextual data initiation script into source code of the webpage;

executing the contextual data initiation script at the client device;

transmitting, from the client device over a network to an analysis server, contextual attribute data that is indicative of an interaction of a user with the client device and the webpage during display of the content;

collecting, at the client device, behavioural data of the user during display of the content;

applying the behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content;

synchronising, at the analysis server, the attention data with the contextual attribute data to generate an effectiveness data set that links evolution over time of the attentiveness parameter with corresponding contextual attribute data obtained during display of the content; and storing the effectiveness data set in a data store, wherein upon executing the contextual data initiation script, the method further includes:

determining consent to transmit the contextual attribute data and behavioural data to the analysis server;

determining availability of a device for collecting the behavioural data; and ascertaining whether or not the user is selected for behavioural data collection, wherein the method further comprises terminating a behavioural data collection procedure upon determining, by the client device using the contextual data initiation script, that:

(i) consent to transmit behavioural data is withheld, or (ii) a device for collecting the behavioural data is not available, or (iii) the user is not selected for behavioural data collection.

13. The computer-implemented method of claim 12, wherein the method further comprises loading a real-time communication protocol for transmitting the behavioural data from the client device to the analysis server upon determining, by the client device using the contextual data initiation script, that (i) consent to transmit behavioural data is given, and (ii) a device for collecting the behavioural data is available, and (iii) the user is selected for behavioural data collection.

14. A computer-implemented method of collecting data for determining attention paid to a display of content, the method comprising:

displaying content on a client device;

transmitting, from the client device over a network to an analysis server, contextual attribute data that is indicative of an interaction of a user with the client device during display of the content;

collecting, at the client device, behavioural data of the user during display of the content;

applying the behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content;

synchronising, at the analysis server, the attention data with the contextual attribute data to generate an effectiveness data set that links evolution over time of the attentiveness parameter with corresponding contextual attribute data obtained during display of the content;

storing the effectiveness data set in a data store;

receiving, by a reporting device over the network, a query for information from the effectiveness data set;

extracting, by the reporting device from the data store, response data in answer to the query; and transmitting, by the reporting device, the response data over the network.

15. A computer-implemented method of collecting data for determining attention paid to a display of content, the method comprising:

displaying content on a client device;

transmitting, from the client device over a network to an analysis server, contextual attribute data that is indicative of an interaction of a user with the client device during display of the content;

collecting, at the client device, behavioural data of the user during display of the content;

applying the behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content;

synchronising, at the analysis server, the attention data with the contextual attribute data to generate an effectiveness data set that links evolution over time of the attentiveness parameter with corresponding contextual attribute data obtained during display of the content;

storing the effectiveness data set in a data store;

receiving, by the analysis server, contextual attribute data and behavioural data from a plurality of client devices; and aggregating, by the analysis server, a plurality of effectiveness data sets obtained from the contextual attribute data and behavioural data received from the plurality of client devices, wherein the plurality of effective data sets are aggregated with respect to one or more common dimensions shared by the contextual attribute data and behavioural data received from the plurality of client devices.

16. The computer-implemented method of claim 15, wherein the common dimensions include any of web domain, website identity, time of day, and type of content.

17. A system for collecting data for determining attention paid to displayed content, the system comprising a plurality of client device communicable over a network with a content server and an analysis server,
  wherein each client device is configured to:
    display content;
    transmit, to the analysis server, contextual attribute data that is indicative of an interaction of a user with the client device during display of the content; and
    collect behavioural data of the user during display of the content,
  wherein the system is further configured to:
    apply the received behavioural data to a classification algorithm to generate attention data for the user, wherein the classification algorithm is a machine learning algorithm trained to map behavioural data to an attentiveness parameter, and wherein the attention data is indicative of variation of the attentiveness parameter over time during display of the content, and
    where no behavioural data is available from the client device, apply the contextual attribute data to a prediction algorithm to generate predicted attention data for the user, wherein the prediction algorithm is a machine learning algorithm trained to map contextual attribute data to an attentiveness parameter, and wherein the predicted attention data is indicative of variation of the attentiveness parameter over time during display of the content, and
  wherein the analysis server is configured to:
    synchronise the attention data and the predicted attention data with the contextual attribute data to generate an effectiveness data set that links evolution over time of the attentiveness parameter with corresponding contextual attribute data obtained during display of the content; and
    store the effectiveness data set in a data store.

18. A computer-implemented method for optimising a digital advertising campaign, the method comprising:
  accessing an effectiveness data set that expresses evolution over time of an attentiveness parameter during playing of a piece of advertising content belonging to a digital advertising campaign to a plurality of users, wherein the attentiveness parameter is obtained by applying behavioural data collected from each user during playing of the piece of advertising content to a machine learning algorithm trained to map behavioural data to the attentiveness parameter;
  generating a candidate adjustment to a target audience strategy associated with the digital advertising campaign;
  predicting an effect on the attentiveness parameter applying the candidate adjustment;
  evaluating the predicted effect against a campaign objective for the digital advertising campaign; and
  updating the target audience strategy with the candidate adjustment if the predicted effect improves performance against the campaign objective by more than a threshold amount,
  wherein updating the target audience strategy with the candidate adjustment occurs automatically if the predicted effect improves the attentiveness parameter by more than a threshold amount.

19. The computer-implemented method of claim 18, wherein the effectiveness data set further includes user profile information indicative of the users' demographics and interests, and wherein the candidate adjustment to the target audience strategy changes demographic or interest information of the target audience.

* * * * *